(12) United States Patent
Kavanagh et al.

(10) Patent No.: US 10,462,024 B1
(45) Date of Patent: Oct. 29, 2019

(54) STATE GENERATION SYSTEM FOR A SEQUENTIAL STAGE APPLICATION

(71) Applicant: Chicago Mercantile Exchange Inc., Chicago, IL (US)

(72) Inventors: Kyle Dennis Kavanagh, Chicago, IL (US); José Antonio Acuña-Rohter, Des Plaines, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 76 days.

(21) Appl. No.: 15/813,968

(22) Filed: Nov. 15, 2017

(51) Int. Cl.
  *G06F 3/048* (2013.01)
  *H04L 12/26* (2006.01)
  *G06F 3/0484* (2013.01)

(52) U.S. Cl.
  CPC .......... *H04L 43/067* (2013.01); *G06F 3/0484* (2013.01); *H04L 43/0852* (2013.01); *H04L 43/12* (2013.01)

(58) Field of Classification Search
  None
  See application file for complete search history.

(56) References Cited

U.S. PATENT DOCUMENTS

| | | | |
|---|---|---|---|
| 6,766,304 B2 | 7/2004 | Kemp, II et al. | |
| 6,772,132 B1 | 8/2004 | Kemp, II et al. | |
| 7,831,491 B2 | 11/2010 | Newell et al. | |
| 7,853,499 B2 | 12/2010 | Czupek et al. | |
| 7,886,054 B1 | 2/2011 | Nag et al. | |
| 9,110,770 B1 | 8/2015 | Raju et al. | |
| 9,378,385 B1 | 6/2016 | Zhu et al. | |
| 9,582,551 B2 | 2/2017 | Mandel et al. | |
| 9,762,460 B2 | 9/2017 | Pawlowski et al. | |
| 2005/0096999 A1 | 5/2005 | Newell et al. | |
| 2010/0306323 A1 | 12/2010 | Gourevitch | |

(Continued)

OTHER PUBLICATIONS

Extended European Search Report, from EP Application No. 18206502.9, dated May 29, 2019, EP.

*Primary Examiner* — Tuan C Dao
(74) *Attorney, Agent, or Firm* — Lempia Summerfield Katz LLC

(57) ABSTRACT

A computer implemented method includes collecting, at a memory of a computing device having a processor, message processing latency information about processing electronic data transaction request messages over a timeframe by an application including a plurality of sequential stages; presenting, in a graphical user interface (GUI) rendered on a display coupled to the computing device, a digital dashboard, the digital dashboard displaying: for each stage, a stage box representing the stage positioned on a y-axis so as to represent a message processing latency associated with the stage over the timeframe; an inter-arrival message rate line positioned on the y-axis so as to represent an arrival rate between the electronic data transaction request messages over the timeframe; and an application box representing the application positioned on the y-axis so as to represent a message processing latency associated with the application over the timeframe; and in response to detecting a re-positioning of a stage box or the inter-arrival message rate line, displaying, on the digital dashboard, the application box at a different position associated with an expected message processing latency.

21 Claims, 13 Drawing Sheets

(56) References Cited

U.S. PATENT DOCUMENTS

| | | |
|---|---|---|
| 2012/0054768 A1 | 3/2012 | Kanna |
| 2014/0006243 A1 | 1/2014 | Boudreault et al. |
| 2014/0032298 A1* | 1/2014 | Corrie ................ G06Q 30/0246 |
| | | 705/14.27 |
| 2017/0018031 A1 | 1/2017 | Bandy et al. |
| 2017/0103457 A1 | 4/2017 | Acuna-Rohter et al. |
| 2017/0146987 A1 | 5/2017 | Ramakrishnan et al. |
| 2017/0168993 A1* | 6/2017 | Prakash ................ G06F 16/248 |
| 2018/0248709 A1* | 8/2018 | Leydon ............... H04L 12/1859 |
| 2018/0248772 A1* | 8/2018 | Orsini .................... H04L 67/34 |

* cited by examiner

STATE GENERATION SYSTEM FOR A SEQUENTIAL STAGE APPLICATION

BACKGROUND

Software applications have become indispensable in the modern world, and many of the world's biggest corporations rely on complex software applications to quickly and efficiently perform critical tasks. Many software applications include different stages, which may be different functions or processes executed by the software application code. Some software applications process or operate on a high volume of messages, e.g., millions of messages, with sub-microsecond response time. Software applications that process high message volumes may be characterized by a message processing latency, which may reflect the amount of time necessary to process or execute each message. In high-speed, high-volume applications, the efficiency and usefulness of a software application may be based in large part on the application's overall message processing latency. Institutions spend millions of dollars monitoring and understanding their software applications so that the applications can be optimized and improved. Performance measurement systems monitor and record information about the operation of a system, such as by logging the progress of messages through an application or code. Software engineers are tasked with optimizing the performance of an application to minimize the amount of time required to process messages and require suitable systems to do so.

DETAILED DESCRIPTION

Figure 1:
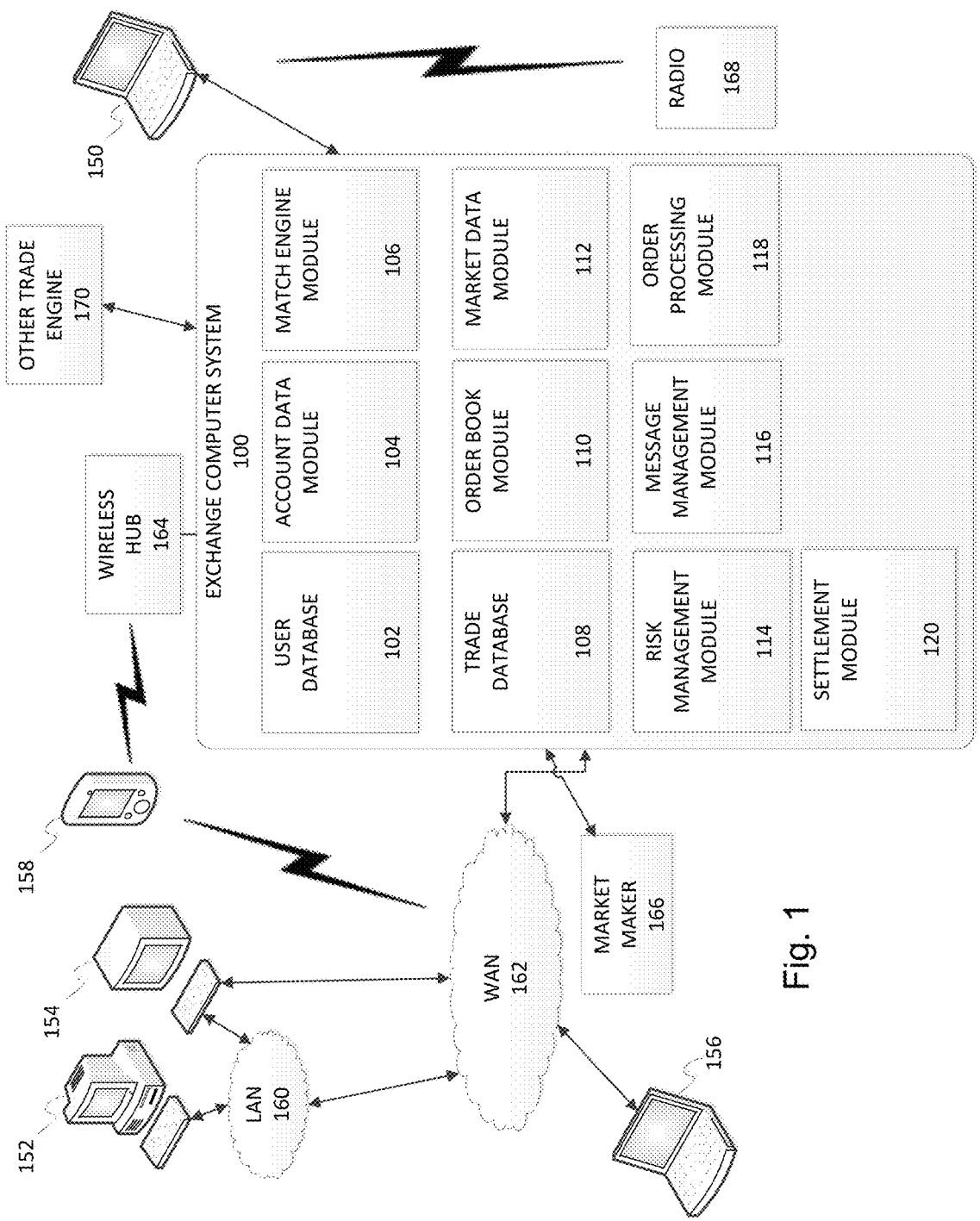
FIG. 1 depicts a computer network system, according to some embodiments.

The disclosed systems and methods enable manual and/or automated visualization, manipulation, and simulation of stage latencies and message arrival rates for different stages of an application to optimize message processing, and therefore improve the performance of the application. Many applications include stages that are executed or implemented in a defined sequence. For example, an application may include a conversion stage, a processing stage, and a publish stage. Each message received by the application is first converted, e.g., to an appropriate format, then processed, and then published, e.g., to other applications, in that order. Each stage may only be capable of processing a single message at a time. The messages may be handled by the application in a first-in, first-out (FIFO) order.

In a high speed, high volume environment, the speed with which an application can execute messages is critical to the success of the application, and for the satisfaction of the users of the application. It is important to ensure that the application performs as quickly and efficiently as possible, at the lowest possible message processing latency. If the message processing latency of the application exceeds the expected or allowable latency, the code may need to be optimized (e.g., identify and eliminate inefficient code), and/or more computing resources (e.g., memory, CPU processing cycles, cores and/or threads) may need to be allocated to the application. One of the stages may be incurring a large queue, that is, messages may be arriving into a stage at a rate faster than that stage can process a message.

Application performance improvement may be achieved by reducing overall message processing latency. Any latency improvement to a stage may come at a cost, namely, the amount of time and computing resources required to cause such latency improvement. The amount of performance improvement achieved, and the efforts/costs for achieving such improvement, is a tradeoff.

One of the most efficient ways to improve overall application performance is to identify and improve bottlenecks. The criterion used to determine whether a stage is a bottleneck may vary depending on the application and may be configurable by an administrator. For example, one criterion for defining a bottleneck is if a stage cannot process messages at least as quickly as they are received, then that stage is a bottleneck. In such a case, messages must wait in a queue before they can enter a stage. Any time a message waits in a queue could be considered unnecessary and the reason for a bottleneck.

Or, a stage that disproportionally contributes to the latency of an application relative to the other stages in the application may be considered to be a bottleneck. A stage that requires the most processing time may be considered a bottleneck.

Complex applications, which have multiple sequential stages, may process messages received from external sources (i.e., not controlled by the application developer). For example, a financial exchange computing system processes messages as they are submitted from clients/traders to the exchange computing system. The speed/rate and timing of the submitted messages is out of the control of the exchange computing system in charge of the application that processes said messages. Because the complex application includes multiple different stages and because the application receives messages at a varying/dynamic rate, identifying bottlenecks (however a bottleneck may be defined for that application) becomes difficult. In many cases, even if a bottleneck is identified, improving the performance of a stage identified to be a bottleneck may not cause an appreciable improvement on the overall application performance time. In such cases, the time, money, and computing resources spent to reduce the message processing latency of the bottleneck stage could be considered wasted. In short, it is not always apparent to a software developer which areas/stages of an application should be prioritized for the best way to reduce overall application message processing latency.

Some systems, such as the systems described in U.S. Patent Application Publication No. 20170103457, filed on Oct. 20, 2015, entitled "Systems and Methods for Calculating a Latency of a Transaction Processing System", assigned to the assignee of the present application, the entirety of which is incorporated by reference herein and relied upon ("the '614 application"), predict the latencies of different stages/components of an application, such as a match engine module, based on the number and types of messages waiting in queue and/or being serviced by the stages/components of the match engine module. Other systems may predict or estimate how much time would be needed for an application to process messages. Such latency prediction systems can be useful for simulating how the application response time would change if the performance of one or more of the stages were to change, or if the inter-arrival rate into the system were to vary.

However, latency predication systems for a multiple sequential stage application where the latency of each stage can vary, and where the inter-arrival rate into the application, as well as into each of the stages, can vary, can be difficult for a user to use because each of the variables (e.g., latency for each stage, inter-arrival rate into the application) needs to be specified by the user. And, the effects of a simulated system state can also be difficult for the user to understand or effectively use for application optimization because simply indicating to the user the estimated latency of a new simulated state does not impart any information about comparing the benefits of one simulated state versus another simulated state. For example, optimizing for multiple variables is complex and makes finding the overall optimal solution difficult.

The disclosed system implements a Multi-Stage View of all the stages of an application that depicts the individual current latencies for all of the stages, as well as the application to which those individual latencies contribute, over a user-specified timeframe. In a multiple sequential stage application, the different stage latencies, stage latency distributions and inter-arrival rate collectively define an application state. The Multi-Stage View is interactive and can be manipulated to simulate different application states. The Multi-Stage View may be displayed in a digital dashboard which presented on a display device that renders a graphical user interface (GUI).

The state generation system's output state (which may be simulated) can be input into a latency prediction system to predict the latencies of each stage as well as the latency of the overall application. Accordingly, the Multi-Stage View enables a user to conveniently model different application states by re-positioning the elements of the view, such as an inter-arrival rate line into the application and stage representing boxes, which can provide useful information about software application bottlenecks, and prioritization/optimization of time and computing resource allocations.

The disclosed embodiments can be used with any latency prediction system that receives as inputs a stage-level latency for each stage of a multiple sequential stage application and an inter-arrival rate for messages into the application.

The disclosed system allows users to visualize the location of potentially multiple bottlenecks in a multiple sequential stage system and to visually simulate changing the existing service time characteristics of the system to simulate the effect on response. Thus, the user can simulate if some investment in performance of a particular stage will result in marginal or exponential improvements in total response time of the application.

Textual inputs defining the state of the system (which can then be input into a latency prediction system) do not clearly or easily convey the interaction and relationships between stages in a multiple sequential stage application and cannot clearly show which stages act as bottlenecks. Additionally, the number of fields requiring manual data entry would make the interface complex and prone to user error.

The disclosed embodiments may be implemented in a data transaction processing system that processes data items or objects, such as an exchange computing system. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined equations. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. The specifically configured matching processors may additionally generate information indicative of a state of an environment (e.g., the state of the order book) based on the processing and report this information to data recipient computing systems via outbound messages published via one or more data feeds.

Figure 4A:
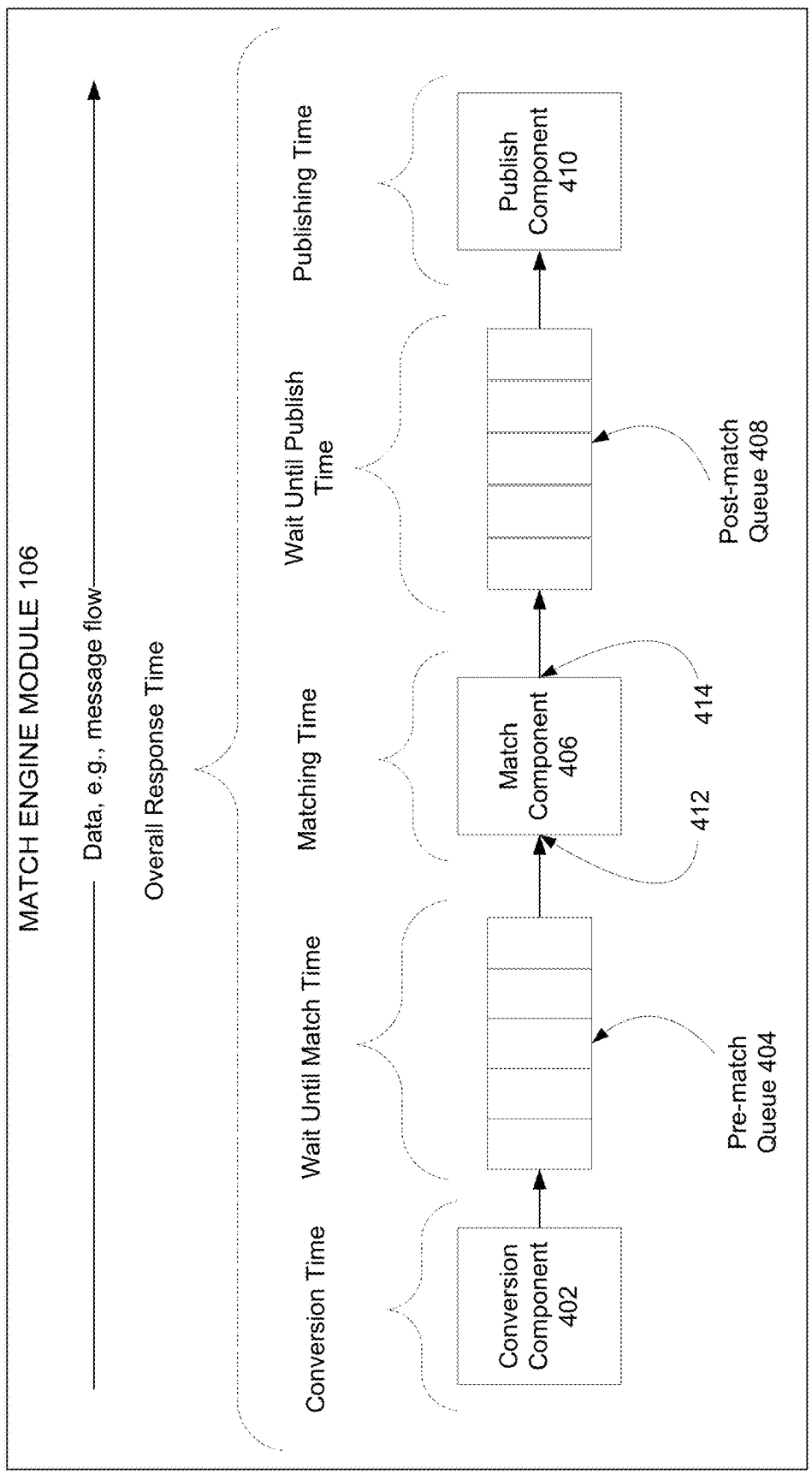
FIG. 4A depicts another storage data structure, according to some embodiments.

The application may be executed by one or more of the matching processors. Thus, the application may be a software match engine module, such as the match engine module illustrated in FIG. 4, which includes multiple different stages, e.g., the conversion component 402, match component 406, and publish component 410. Each stage or component is associated with a message processing latency, i.e., the amount of time needed for that stage to process each electronic data transaction request message. Combining the stage latencies results in an overall application latency. The disclosed embodiments allow a user to determine which of the stages is a bottleneck, and to optimize the time and resources spent on optimizing stages within an application to maximize the corresponding improvement in application performance.

Exchange Computing System

For example, one exemplary environment where the disclosed embodiments may be desirable is in financial markets, and in particular, electronic financial exchanges, such as a futures exchange, such as the Chicago Mercantile Exchange Inc. (CME).

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts, and other derivatives.

Electronic Trading

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing to buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access, and participant expectations with respect thereto. In addition, it may be appreciated that electronic trading systems further impose additional expectations and demands by market participants as to transaction processing speed, latency, capacity, and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus, the electronic marketplace may conduct market activities through electronic systems.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

Electronic Data Transaction Request Messages

As used herein, a financial message, or an electronic message, refers both to messages communicated by market participants to an electronic trading or market system and vice versa. The messages may be communicated using packets or other techniques operable to communicate information between systems and system components. Some messages may be associated with actions to be taken in the electronic trading or market system. In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

Financial messages communicated to the electronic trading system, also referred to as "inbound" messages, may include associated actions that characterize the messages, such as trader orders, order modifications, order cancellations and the like, as well as other message types. Inbound messages may be sent from client devices associated with market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" e.g., Aggregated By Value ("ABV") book, or Market By Order "MBO", e.g., Per Order ("PO") book format). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

For additional details and descriptions of different market data feeds, see U.S. patent application Ser. No. 15/155,565, filed on May 16, 2016, entitled "Systems and Methods for Consolidating Multiple Feed Data", assigned to the assignee of the present application, the entirety of which is incorporated by reference herein and relied upon.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a partial payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or is under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles, and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

Trading Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software-based components. Further, to clarify the use in the pending claims and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
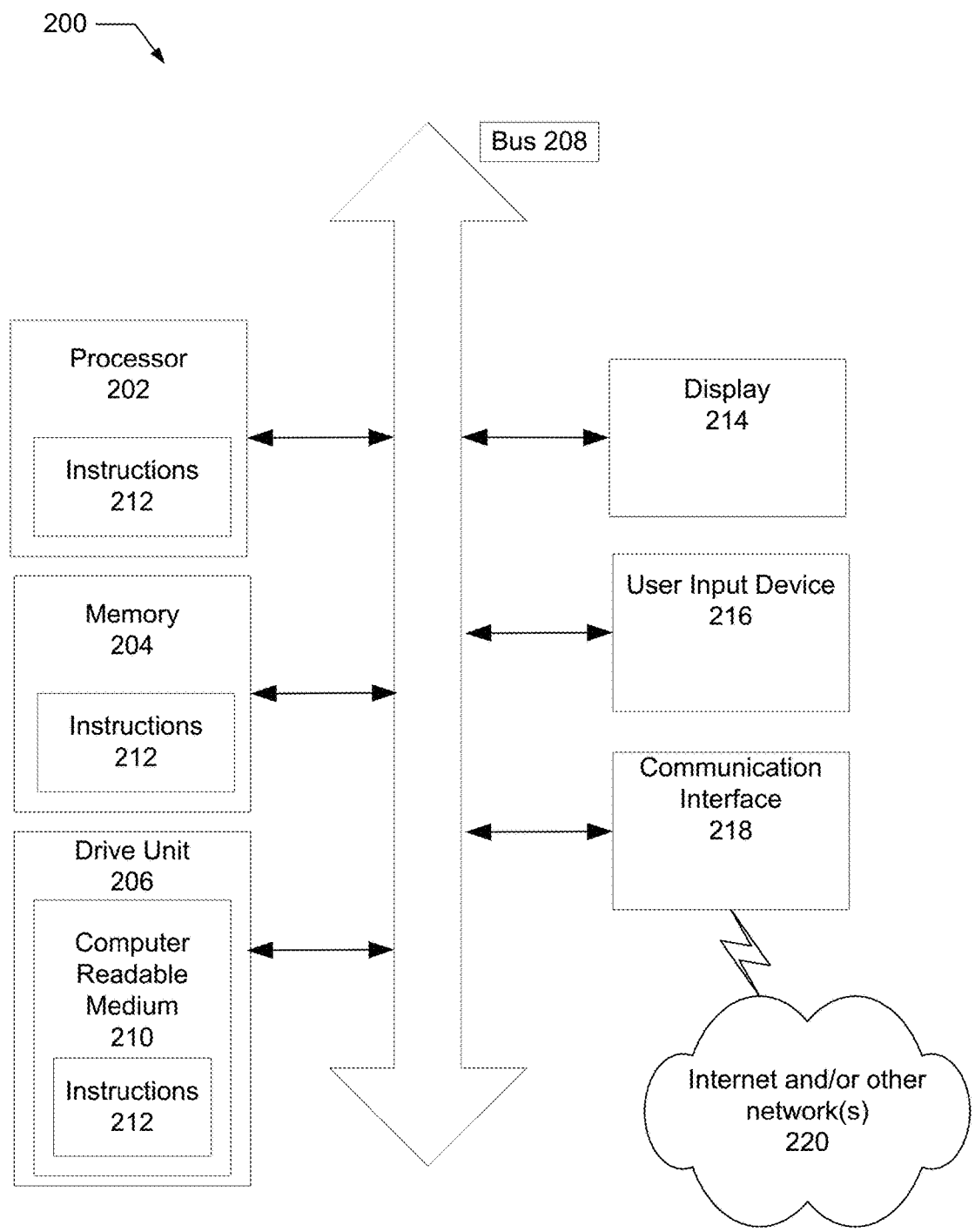
FIG. 2 depicts a general computer system, according to some embodiments.

The exchange computer system 100 may be implemented with one or more mainframe, desktop, or other computers, such as the example computer 200 described herein with respect to FIG. 2.

A user database 102 may be provided which includes information identifying traders and other users of exchange computer system 100, such as account numbers or identifiers, usernames, and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage, or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible, and any remaining or unfilled/unsatisfied quantity is not stored on the books or allowed to rest).

An order processing module 118 may be included to decompose delta-based, spread instrument, bulk, and other types of composite orders for processing by the order book module 110 and/or the match engine module 106. The order processing module 118 may also be used to implement one or more procedures related to clearing an order. The order may be communicated from the message management module 118 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements and may be configured as part of the order book module 110, part of the message management module 118, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 114, the message management module 116, the order processing module 118, the settlement module 120, or other component of the exchange computer system 100.

The disclosed mechanisms may be implemented at any logical and/or physical point(s), or combinations thereof, at which the relevant information/data (e.g., message traffic and responses thereto) may be monitored or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet-based device, or other wireless device, may communicate with the LAN 160 and/or the Internet 162 via radio waves, such as via WIFI, Bluetooth® and/or a cellular telephone-based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer-based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange Inc., of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video, or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random-access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disk, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control, or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images, or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMAX network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disc or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical discs, or optical discs. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical discs; and CD ROM and DVD-ROM discs. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The embodiments described herein utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, an incoming transaction may be received. The incoming transaction may be from, and therefore associated with, a market participant of an electronic market managed by an electronic trading system. The transaction may involve an order as extracted from a received message and may have an associated action. The actions may involve placing an order to buy or sell a financial product in the electronic market or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating to received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time-based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as describe herein.

The order processing module 118 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 118 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 118 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. Such priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 118 and used for determining MQI scores of market participants.

Example Users

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is not a previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transactions from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Matching and Transaction Processing

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for relinquish or sell transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon. Other examples of matching algorithms which may be defined for allocation of orders of a particular financial product include: Price Explicit Time; Order Level Pro Rata; Order Level Priority Pro Rata; Preference Price Explicit Time; Preference Order Level Pro Rata; Preference Order Level Priority Pro Rata; Threshold Pro-Rata; Priority Threshold Pro-Rata; Preference Threshold Pro-Rata; Priority Preference Threshold Pro-Rata; and Split Price-Time Pro-Rata, which are described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may be considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

FIFO generally rewards the first trader to place an order at a particular price and maintains this reward indefinitely. So, if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled.

However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Order Book Object Data Structures

Figure 3:
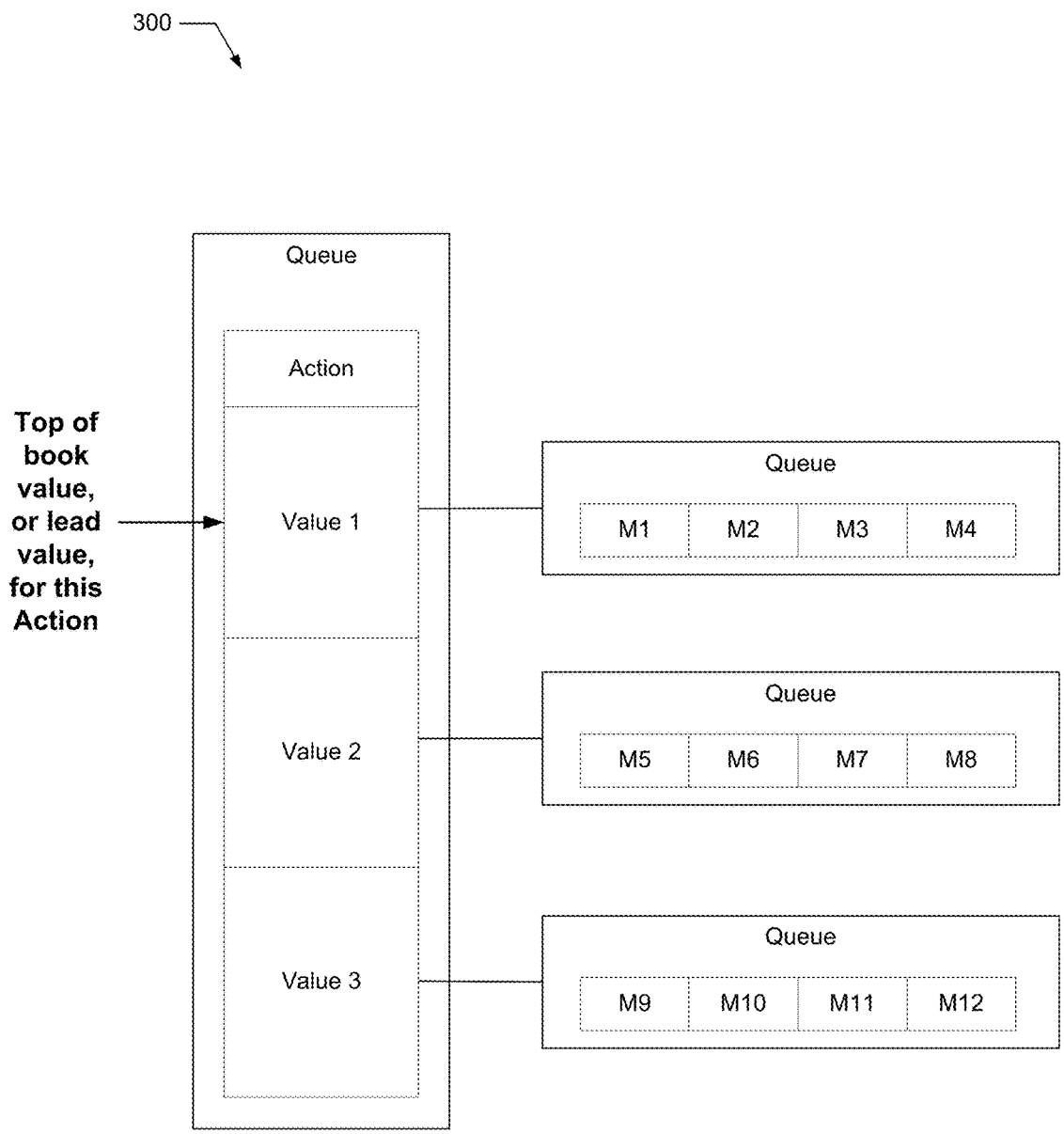
FIG. 3 depicts a storage data structure, according to some embodiments.

In one embodiment, the messages and/or values received for each object may be stored in queues according to value and/or priority techniques implemented by an exchange computing system 100. FIG. 3 illustrates an example data structure 300, which may be stored in a memory or other storage device, such as the memory 204 or storage device 206 described with respect to FIG. 2, for storing and retrieving messages related to different values for the same action for an object. For example, data structure 300 may be a set of queues or linked lists for multiple values for an action, e.g., bid, on an object. Data structure 300 may be implemented as a database. It should be appreciated that the system may store multiple values for the same action for an object, for example, because multiple users submitted messages to buy specified quantities of an object at different values. Thus, in one embodiment, the exchange computing system may keep track of different orders or messages for buying or selling quantities of objects at specified values.

Although the present patent application contemplates using queue data structures for storing messages in a memory, the implementation may involve additional pointers, i.e., memory address pointers, or linking to other data structures. Incoming messages may be stored at an identifiable memory address. The transaction processor can traverse messages in order by pointing to and retrieving different messages from the different memories. Thus, messages that may be depicted sequentially may actually be stored in memory in disparate locations. The software programs implementing the transaction processing may retrieve and process messages in sequence from the various disparate (e.g., random) locations. Thus, in one embodiment, each queue may store different values, which could represent prices, where each value points to or is linked to the messages (which may themselves be stored in queues and sequenced according to priority techniques, such as prioritizing by value) that will match at that value. For example, as shown in FIG. 3, all of the values relevant to executing an action at different values for an object are stored in a queue. Each value in turn points to, e.g., a linked list or queue logically associated with the values. The linked list stores the messages that instruct the exchange computing system to buy specified quantities of the object at the corresponding value.

Transaction Processor Data Structures

FIG. 4 illustrates an example embodiment of a data structure used to implement match engine module 106. Match engine module 106 may include a conversion component 402, pre-match queue 404, match component 406, post-match queue 408 and publish component 410.

Although the embodiments are disclosed as being implemented in queues, it should be understood that different data structures, such as for example linked lists or trees, may also be used. Although the application contemplates using queue data structures for storing messages in a memory, the implementation may involve additional pointers, i.e., memory address pointers, or linking to other data structures. Thus, in one embodiment, each incoming message may be stored at an identifiable memory address. The transaction processing components can traverse messages in order by pointing to and retrieving different messages from the different memories. Thus, messages that may be processed sequentially in queues may actually be stored in memory in disparate locations. The software programs implementing the transaction processing may retrieve and process messages in sequence from the various disparate (e.g., random) locations.

The queues described herein may, in one embodiment, be structured so that the messages are stored in sequence according to time of receipt, e.g., they may be first-in/first-out (FIFO) queues.

The match engine module 106 may be an example of a transaction processing system. The pre-match queue 404 may be an example of a pre-transaction queue. The match component 406 may be an example of a transaction component. The post-match queue 408 may be an example of a post-transaction queue. The publish component 410 may be an example of a distribution component. The transaction component may process messages and generate transaction component results.

Figure 4B:
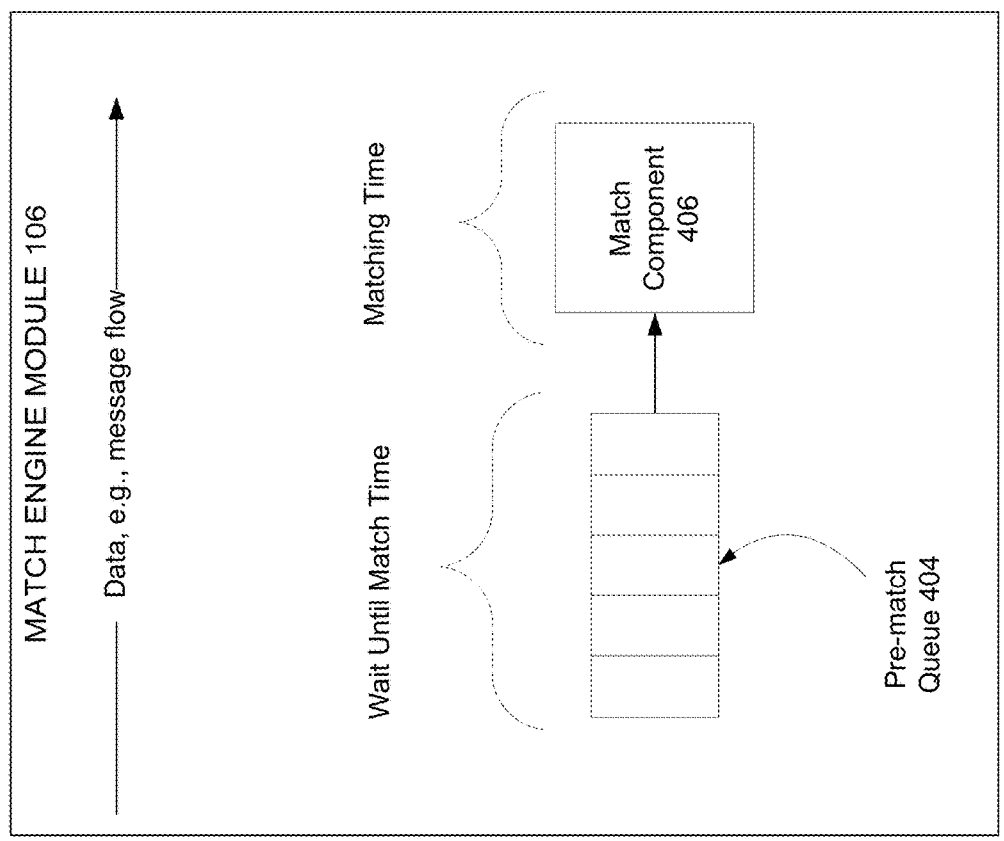
FIG. 4B depicts yet another storage data structure, according to some embodiments.

It should be appreciated that match engine module 106 may not include all of the components described herein. For example, match engine module 106 may only include pre-match queue 404 and match component 406, as shown in FIG. 4B. In one embodiment, the latency detection system may detect how long a message waits in a pre-match queue 404 (e.g., latency), and compares the latency to the maximum allowable latency associated with the message.

In one embodiment, the publish component may be a distribution component that can distribute data to one or more market participant computers. In one embodiment, match engine module 106 operates according to a first-in/first-out (FIFO) ordering. The conversion component 402 converts or extracts a message received from a trader via the Market Segment Gateway or MSG into a message format that can be input into the pre-match queue 404.

Messages from the pre-match queue may enter the match component 406 sequentially and may be processed sequentially. In one regard, the pre-transaction queue, e.g., the pre-match queue, may be considered to be a buffer or waiting spot for messages before they can enter and be processed by the transaction component, e.g., the match component. The match component matches orders, and the time a message spends being processed by the match component can vary, depending on the contents of the message and resting orders on the book. Thus, newly received messages wait in the pre-transaction queue until the match component is ready to process those messages. Moreover, messages are received and processed sequentially or in a first-in, first-out FIFO methodology. The first message that enters the pre-match or pre-transaction queue will be the first message to exit the pre-match queue and enter the match component. In one embodiment, there is no out-of-order message processing for messages received by the transaction processing system. The pre-match and post-match queues are, in one embodiment, fixed in size, and any messages received when the queues are full may need to wait outside the transaction processing system or be re-sent to the transaction processing system.

The match component 406 processes an order or message, at which point the transaction processing system may consider the order or message as having been processed. The match component 406 may generate one message or more than one message, depending on whether an incoming order was successfully matched by the match component. An order message that matches against a resting order in the order book may generate dozens or hundreds of messages. For example, a large incoming order may match against several smaller resting orders at the same price level. For example, if many orders match due to a new order message, the match engine needs to send out multiple messages informing traders which resting orders have matched. Or, an order message may not match any resting order and only generate an acknowledgement message. Thus, the match component 406 in one embodiment will generate at least one message, but may generate more messages, depending upon the activities occurring in the match component. For example, the more orders that are matched due to a given message being processed by the match component, the more time may be needed to process that message. Other messages behind that given message will have to wait in the pre-match queue.

Messages resulting from matches in the match component 406 enter the post-match queue 408. The post-match queue may be similar in functionality and structure to the pre-match queue discussed above, e.g., the post-match queue is a FIFO queue of fixed size. As illustrated in FIG. 4, a difference between the pre- and post-match queues may be the location and contents of the structures, namely, the pre-match queue stores messages that are waiting to be processed, whereas the post-match queue stores match component results due to matching by the match component. The match component receives messages from the pre-match queue and sends match component results to the post-match queue. In one embodiment, the time that messages, generated due to the transaction processing of a given message, spent in the post-match queue is not included in the latency calculation for the given message.

Messages from the post-match queue 408 enter the publish component 410 sequentially and are published via the MSG sequentially. Thus, the messages in the post-match queue 408 are an effect or result of the messages that were previously in the pre-match queue 404. In other words, messages that are in the pre-match queue 404 at any given time will have an impact on or affect the contents of the post-match queue 408, depending on the events that occur in the match component 406 once the messages in the pre-match queue 404 enter the match component 406.

As noted above, the match engine module 106 in one embodiment operates in a first-in, first-out (FIFO) scheme. In other words, the first message that enters the match engine module 106 is the first message that is processed by the match engine module 106. Thus, the match engine module 106 in one embodiment processes messages in the order the messages are received. In FIG. 4, as shown by the data flow arrow, data is processed sequentially by the illustrated structures from left to right, beginning at the conversion component 402, to the pre-match queue, to the match component 406, to the post-match queue 408, and to the publish component 410. The overall transaction processing system operates in a FIFO scheme such that data flows from element 402 to 404 to 406 to 408 to 410, in that order. If any one of the queues or components of the transaction processing system experiences a delay, that creates a backlog for the structures preceding the delayed structure. For example, if the match or transaction component is undergoing a high processing volume, and if the pre-match or pre-transaction queue is full of messages waiting to enter the match or transaction component, the conversion component may not be able to add any more messages to the pre-match or pre-transaction queue.

Messages wait in the pre-match queue. The time a message waits in the pre-match queue depends upon how many messages are ahead of that message (i.e., earlier messages), and how much time each of the earlier messages spends being serviced or processed by the match component. Messages also wait in the post-match queue. The time a message waits in the post-match queue depends upon how many messages are ahead of that message (i.e., earlier messages), and how much time each of the earlier messages spends being serviced or processed by the publish component. These wait times may be viewed as a latency that can affect a market participant's trading strategy.

After a message is published (after being processed by the components and/or queues of the match engine module), e.g., via a market data feed, the message becomes public information and is publicly viewable and accessible. Traders consuming such published messages may act upon those messages, e.g., submit additional new input messages to the exchange computing system responsive to the published messages.

The match component attempts to match aggressing or incoming orders against resting orders. If an aggressing order does not match any resting orders, then the aggressing order may become a resting order, or an order resting on the books. For example, if a message includes a new order that is specified to have a one-year time in force, and the new order does not match any existing resting order, the new order will essentially become a resting order to be matched (or attempted to be matched) with some future aggressing order. The new order will then remain on the books for one year. On the other hand, an order specified as a fill or kill (e.g., if the order cannot be filled or matched with an order currently resting on the books, the order should be canceled) will never become a resting order, because it will either be filled or matched with a currently resting order, or it will be canceled. The amount of time needed to process or service a message once that message has entered the match component may be referred to as a service time. The service time for a message may depend on the state of the order books when the message enters the match component, as well as the contents, e.g., orders, that are in the message.

In one embodiment, orders in a message are considered to be "locked in", or processed, or committed, upon reaching and entering the match component. If the terms of the aggressing order match a resting order when the aggressing order enters the match component, then the aggressing order will be in one embodiment guaranteed to match.

As noted above, the latency experienced by a message, or the amount of time a message spends waiting to enter the match component, depends upon how many messages are ahead of that message (i.e., earlier messages), and how much time each of the earlier messages spends being serviced or processed by the match component. The amount of time a match component spends processing, matching, or attempting to match a message depends upon the type of message, or the characteristics of the message. The time spent inside the processor may be considered to be a service time, e.g., the amount of time a message spends being processed or serviced by the processor.

The number of matches or fills that may be generated in response to a new order message for a financial instrument will depend on the state of the data object representing the electronic marketplace for the financial instrument. The state of the match engine can change based on the contents of incoming messages.

It should be appreciated that the match engine's overall latency is in part a result of the match engine processing the messages it receives. The match component's service time may be a function of the message type (e.g., new, modify, cancel), message arrival rate (e.g., how many orders or messages is the match engine module receiving, e.g., messages per second), message arrival time (e.g., the time a message hits the inbound MSG or market segment gateway), number of fills generated (e.g., how many fills were generated due to a given message, or how many orders matched due to an aggressing or received order), or number of Mass Quote entries (e.g., how many of the entries request a mass quote).

In one embodiment, the time a message spends:

Being converted in the conversion component 402 may be referred to as a conversion time;

Waiting in the pre-match queue 404 may be referred to as a wait until match time;

Being processed or serviced in the match component 406 may be referred to as a matching time;

Waiting in the post-match queue 408 may be referred to as a wait until publish time; and Being processed or published via the publish component 410 may be referred to as a publishing time.

It should be appreciated that the latency may be calculated, in one embodiment, as the sum of the conversion time and wait until match time. Or, the system may calculate latency as the sum of the conversion time, wait until match time, matching time, wait until publish time, and publishing time. In systems where some or all of those times are negligible, or consistent, a measured latency may only include the sum of some of those times. Or, a system may be designed to only calculate one of the times that is the most variable, or that dominates (e.g., percentage wise) the overall latency. For example, some market participants may only care about how long a newly sent message that is added to the end of the pre-match queue will spend waiting in the pre-match queue. Other market participants may care about how long that market participant will have to wait to receive an acknowledgement from the match engine that a message has entered the match component. Yet other market participants may care about how much time will pass from when a message is sent to the match engine's conversion component to when match component results exit or egress from the publish component.

State Generation System

Figure 5:
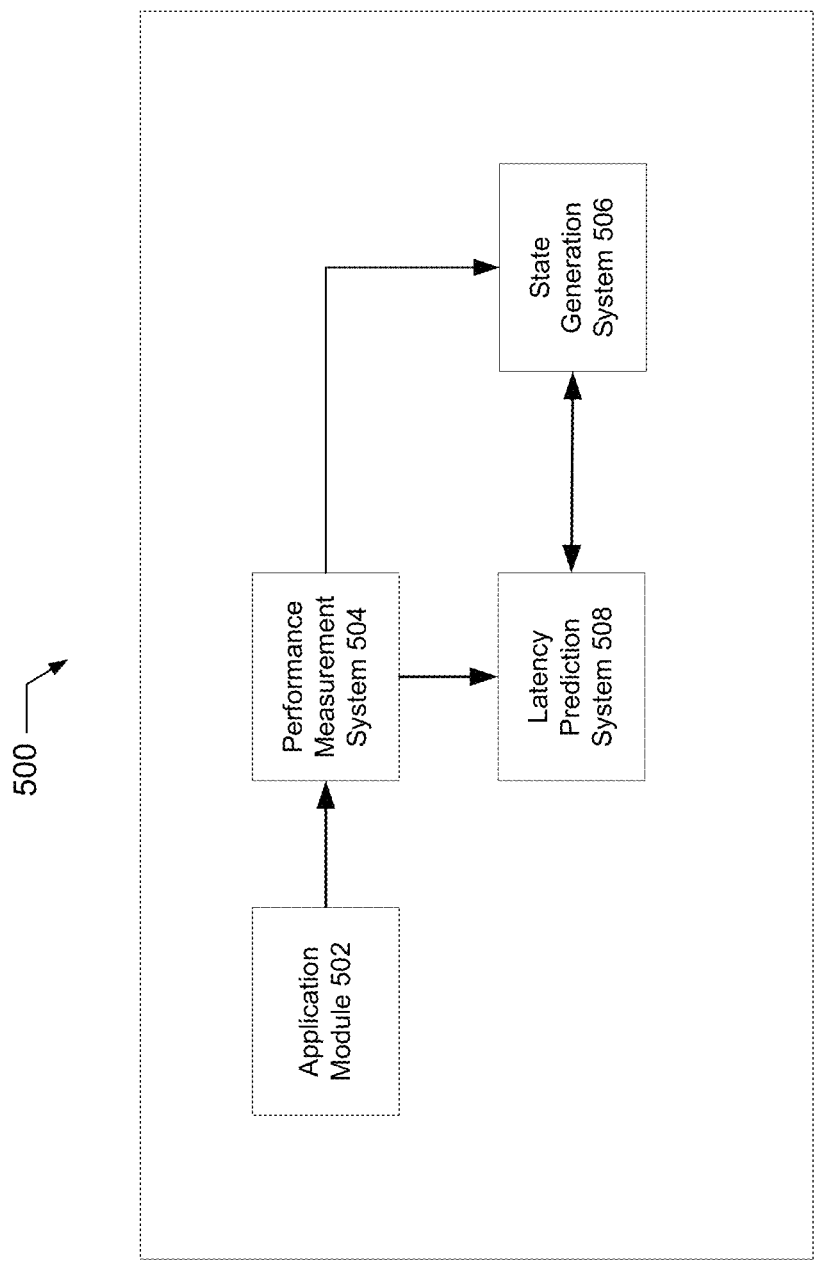
FIG. 5 depicts a block diagram of a computer system including a state generation system, according to some embodiments.

FIG. 5 illustrates an example block diagram of system 500, which may be similar to exchange computing system 100. System 500 includes an application module 502, which may be similar to match engine module 106, that receives and processes electronic data transaction request messages. A performance measurement system 504 monitors and records information about the application's message processing performance, such as by logging the progress of messages through the stages of the application. U.S. patent application Ser. No. 15/691,052, filed on Aug. 30, 2017, entitled "Compressed Message Tracing and Parsing" (the '052 application"), and U.S. patent application Ser. No. 15/727,097, filed on Oct. 6, 2017, entitled "Dynamic Tracer Message Logging Based on Bottleneck Detection", both of which are assigned to the assignee of the present application and incorporated by reference herein in their entireties and relied upon, describe example performance measurement systems.

The disclosed embodiments provide methods of displaying and manipulating stage-level data, referred to herein as a Multi-Stage View, which can be utilized for convenient performance assessment and simulation by a user. A state generation system 506 generates a Multi-Stage View of the performance/state of the application over a specified timeframe, as discussed below. The state generation system 506 may also enable a user to simulate different application states and may communicate with a latency prediction system 508 to determine simulated latencies for the application, as also discussed below. The latency prediction system 508 may be the latency prediction system described in the '614 application or may be another latency prediction system that accepts the output (e.g., the application state) of the state generation system as an input and simulates/outputs an application latency for that input application state.

The Multi-Stage View is, in one embodiment, a two-dimensional representation of multiple stages of an application arranged along a y-axis representing latency or time. The stages are arranged along an x-axis according to the sequence of the stages in the application. The state generation system presents a Multi-Stage View in a graphically meaningful way that allows a user to visualize and understand relationships between the latencies of multiple stages within an application, their latency distributions, and an incoming message arrival rate, which collectively define the state of an application, and how the position and arrangement of the stages and the message arrival rate impact an overall message processing latency of the application.

A software developer tasked with improving the performance of an application that processes electronic data transaction request messages can use the state generation system to generate the Multi-Stage View for the application. The generated Multi-Stage View is presented via a display device 214.

Figure 6:
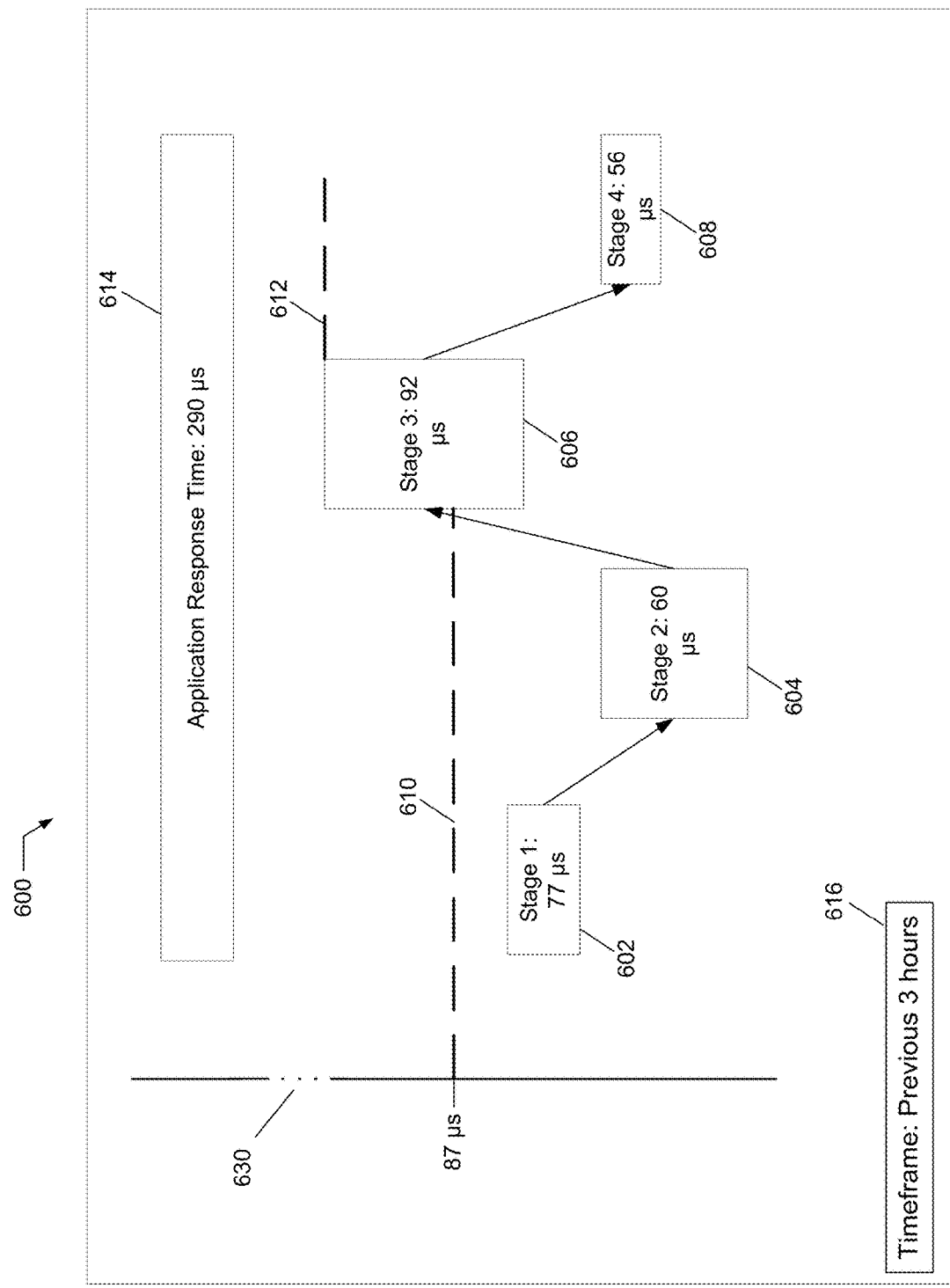
FIG. 6 illustrates a Multi-Stage View generated by a state generation system, according to some embodiments.

FIG. 6 illustrates an example Multi-Stage View 600 including data representations of the stages making up a software application. In particular, Multi-Stage View 600 includes boxes 602, 604, 606, and 608 representing stages 1, 2, 3, and 4, respectively, of a software application, such as a match engine module 106. Each stage may be a process or function within the application. In the disclosed embodiments, the application is a software application that operates upon messages, such as electronic data transaction request messages. The stages are sequential, so that an electronic data transaction request message is first processed by stage 1, then stage 2, then stage 3, and then stage 4. The Multi-Stage View depicts the stages in the sequence they operate upon messages processed by the application.

The developer selects the timeframe 616 over which to analyze electronic data transaction request messages. The developer can modify the timeframe 616 to check if the bottleneck stage changes over different timeframes.

The performance measurement system collects information about processing of electronic data transaction request messages by each stage. Each of the stages is associated with a performance distribution over a timeframe specified by a user of the state generation system. The amount of time needed for a stage to process a particular message may vary and may depend on the contents of the message, as well as one or more external conditions, such as the state of an order book associated with the product or financial instrument that is the subject of the electronic data transaction request message. Thus, over a period of time, the message processing latency by a stage forms a distribution. Most message processing latencies cluster around an average message processing latency, but some messages are outliers and may require much less or much more time than usual. The actual message processing latency may be the time actually needed for a message to be processed by a given stage. Thus, the performance measurement system may include a database or data store of historical response time or actual latency data for how much time was spent for messages to be processed by the different stages of the application.

The stages may be delineated via the use of checkpoints. Different portions of a software application's code may be identifiable as, for example, different line numbers. As described in the '052 Application, checkpoints may be inserted into the application code by a developer at points of interest in the code. A checkpoint's location in the code may be identifiable, e.g., via an identifier for the associated line, or a line number. For example, a software application may include multiple checkpoints at specified locations or lines in the code that define the various stages within the application. Stage 1 may be associated with lines 1 to 50 of a software code, where checkpoints may identify lines 1 (beginning of stage 1) and 50 (end of stage 1). At each checkpoint, the software code may include a method call to log information such as an identifier, the checkpoint name, and a timestamp to a data store, which may then be parsed for performance analysis. A message progresses through the code associated with the application. When a message traverses a checkpoint, the performance measurement system logs information about the occurrence of the traversal event by recording a message identifier, the checkpoint name, and a timestamp associated with the occurrence of the event.

The performance measurement system accordingly records the amount of time that elapses between a message traversing from one checkpoint defining the beginning of a stage to another checkpoint defining the end of that stage, thus recording the message processing latency associated with a stage. If the checkpoints within an application are modified, then the delineation of stages may change as well. Thus, a developer could modify how stages are defined, and how performance is depicted via the Multi-Stage View, by modifying the checkpoints.

The timeframe over which data is collected for the Multi-Stage View may be configurable by the user. For example, in one embodiment, the Multi-Stage View may be used to present latencies/latency distributions for the various stages over the course of the current trading day. Or, the data presented in the Multi-Stage View may be data collected over the course of a calendar week, e.g., since Monday of a current week. As shown in FIG. 6, the timeframe over which the Multi-Stage View 600 is created is also shown to the user via element 616. In the example of FIG. 6, the timeframe over which data is collected and presented to the user is 3 hours. The timeframe is a rolling window so that as time elapses, the earliest data points are discarded and new data points are used. At any point in time, only the past 3 hours of data are used to generate the information presented in Multi-Stage View 600.

Multi-Stage View 600 presents, in a graphical user interface, four boxes, one box representing each stage of a software application. Again, the stages are sequential, so that a message passes through stage 1, then stage 2, and so on. Multi-Stage View 600 is interpreted from left to right, and the boxes are arranged in the order that a message traverses or passes through the sequential stages. Each stage is linked to its subsequent stage via an arrow to visualize the message processing flow through the application. An arrow may be colored to indicate whether the transition represented by the arrow is leading to a bottleneck stage. For example, if the arrow from stage 1 to stage 2 is green, this visually indicates that the transition from stage 1 to stage 2 is not a bottleneck area.

The state generation system 506 uses information collected by the performance measurement system 504 to generate and present the Multi-Stage View. For example, the state generation system 506 may determine, based on information collected by the performance measurement system 504, that, over the past 3 hours, the average message processing latency of stage 1 is 77 microseconds. As shown in FIG. 6, box 602 is centered vertically at 77 microseconds. Similarly, based on the message processing latencies of stages 2, 3 and 4, box 604 is centered vertically at 60 microseconds, box 606 is centered vertically at 92 microseconds and box 608 is centered vertically at 56 microseconds, respectively. Thus, the Multi-Stage View presents information about how much time is needed to process messages through each of the stages over the course of the selected timeframe (which in the example is 3 hours, but may be the present business day, current week, month, year, etc.).

The y-axis of the graph in Multi-Stage View 600 represents the latency, or time, that is associated with a stage. Each box is associated with a height that is based on a lower and upper bound for the distributions (e.g., 25% and 75%). Thus, the height of box 1 is also based on the distribution time required to process messages by stage 1. For example, the lower bound or lower edge of box 602 may be based on a predefined lower percentile of the distribution (e.g., 25% of the curve 1100) and the upper bound or upper edge of box 602 may be based on a predefined upper percentile of the distribution (e.g., 75% of the curve 1100). Alternatively, in one embodiment, all of the stages may be illustrated as being the same height, i.e., the latency distribution may not be depicted via the box height.

Figure 11:
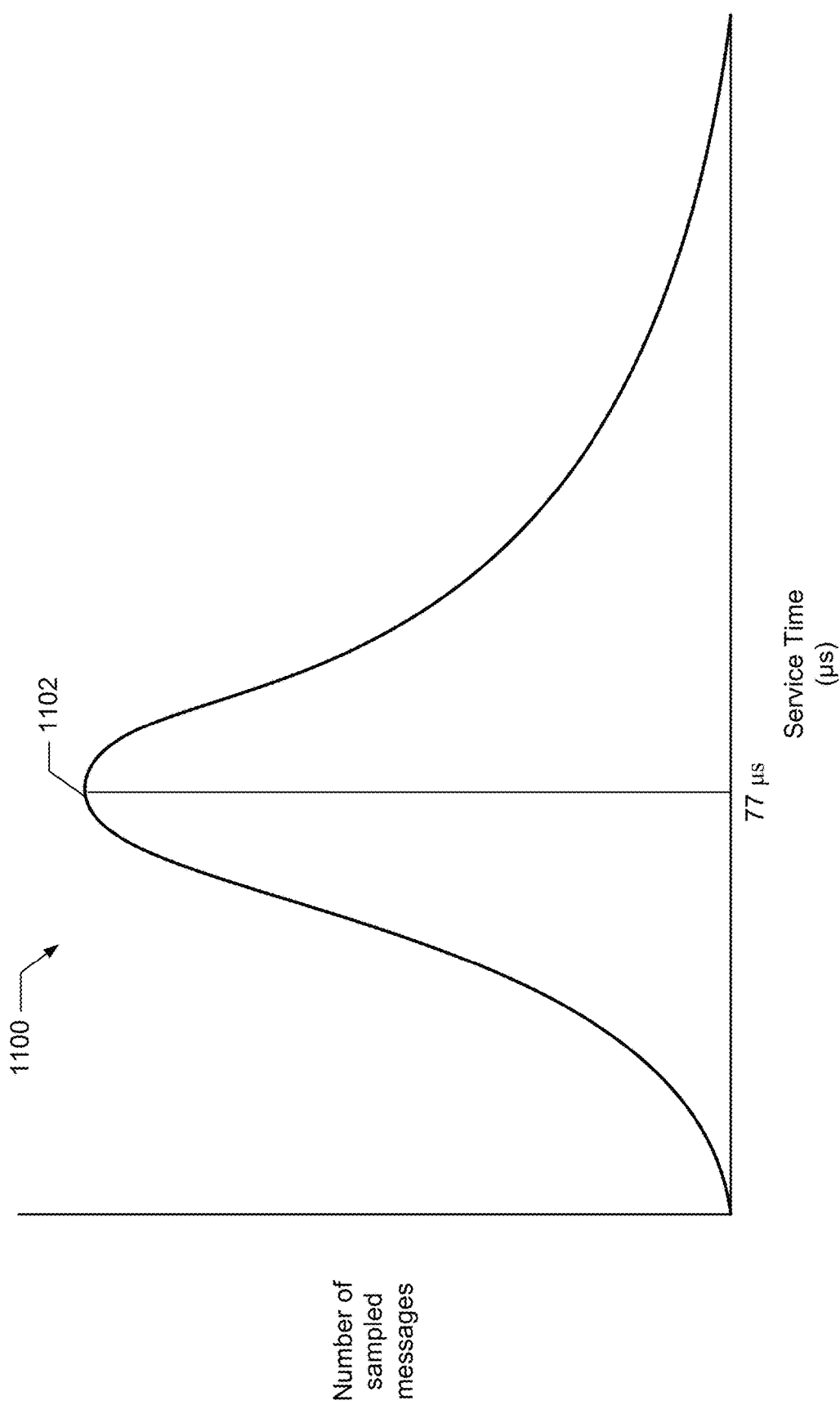
FIG. 11 depicts a latency distribution curve, according to some embodiments.

Referring now to FIG. 11, FIG. 11 illustrates an example message processing latency distribution 1100. Curve 1100 displays a distribution of the percentage of previously processed messages that required an amount of time to be processed or serviced by stage 1 of a software application. It should be appreciated that the data used to generate the distribution 1100 is based on messages previously processed, e.g., over the specified timeframe, e.g., the previous 3 hours, by stage 1. The state generation system may use information from the latency distribution 1100 to generate box 602 representing stage 1 in the Multi-Stage View 600. For example, as shown in FIG. 11, the peak of curve 1100 occurs at point 1102, which represents the amount of time necessary to service/process, by stage 1, the most number of messages. Point 1102 occurs at 77 microseconds. Accordingly, box 1 is centered around 77 microseconds.

Referring back to FIG. 6, Multi-Stage View 600 also includes a dashed horizontal inter-arrival rate line 610 representing an inter-arrival rate of messages into each of the stages. Inter-arrival rate line 610 represents an average rate of messages being received by each of the stages over a period defined by the timeframe. For example, as shown in FIG. 6, over the past 3 hours (timeframe 616), the application has received one message every 87 microseconds. Accordingly, inter-arrival rate line 610 is depicted as beginning (at the y-axis) at 87 microseconds. Because stage 1 is the first stage in the application, the inter-arrival rate for messages into stage 1 is the same as the inter-arrival rate into the application, namely, 87 microseconds.

The message processing time of a stage controls the inter-arrival rate of messages into the next/subsequent stage. For example, if the message processing time of stage 1 was more than 87 microseconds, e.g., 95 microseconds, the inter-arrival rate into stage 2 would become the message processing time of stage 1. In Multi-Stage View 600, the inter-arrival rate line 610 to the right side of a stage (i.e., exiting the stage) is adjusted to be higher when a stage's latency exceeds the inter-arrival rate on the left side of a stage (i.e., entering that stage). For example, in FIG. 6, inter-arrival rate line 610 (the inter-arrival rate before stage 3) shifts to inter-arrival rate line 612 (which represents the inter-arrival rate for stage 4). Accordingly, Multi-Stage View 600 illustrates that the inter-arrival rate line for the different stages can differ, depending upon whether a stage will cause the inter-arrival rate for the next stage to increase. If all of the stages of an application are experiencing an average latency below the inter-arrival rate, the inter-arrival rate line would be represented as a level, unchanging line.

The Multi-Stage View also presents the application response time, which presents the amount of time necessary for the application to process messages over the specified timeframe, via overall application response time box 614.

The application response time is at least the sum of all of the stage message processing latencies but may be greater because messages may need to wait in a queue before being processed by one or more of the stages, as described above. As described above, the overall response time of the multi-stage application depends not only on the message processing latencies of the individual stages in the application, but also depends on the rate of incoming messages. A message may experience a 100-microsecond response time, even if all the message processing latencies of the stages combines for 70 microseconds, if the message waits a total of 30 microseconds to be processed by one or more of the stages.

For example, the sum of stages 1, 2, 3, and 4 for Multi-Stage View 600 is 285 microseconds. Thus, if a message does not have to wait in a queue before a stage, the application response time would be 285 microseconds. However, as shown in FIG. 6, the inter-arrival rate is 87 microseconds, which is less than the processing time of stage 3. Thus, messages arriving at stage 3 are waiting in a queue, as described in connection with FIG. 4. Thus, the overall application response time may be greater, such as 290 microseconds as shown in FIG. 6.

For convenience, in FIG. 6, the y-axis has been compressed/broken off at point 630 to allow application response time box 614 to be depicted. In one embodiment, the position of application box 614 may be shown to scale with the positions of boxes 602, 604, 606, and 608, without compressing/breaking any portion of the y-axis. Like stage boxes 602, 604, 606, and 608, the height of application box 614 may also vary based on the latency distribution of the overall application response time.

The position and arrangement of all the elements of the Multi-Stage View, collectively, define a state of the application. In particular, the amount of time required for messages to be processed by each stage (i.e., stage latency), the latency distribution within each stage, and the inter-arrival rate for each stage all collectively define an application state.

As more electronic data transaction request messages are received and processed by the application, the position and arrangement of the boxes and the inter-arrival rate line are updated based on the newly collected data. Thus, the application state displayed to the developer via Multi-Stage View may be periodically updated based on a configurable refresh rate. For example, the Multi-Stage View on the display device may be dynamic/fluctuating, e.g. simulate continuous arrival and variance, where the visuals are changing continuously.

The Multi-Stage View enables the developer to easily visually identify which stage is acting as a bottleneck for an application. In an embodiment, a stage may be considered to be a bottleneck if its average latency is greater than the inter-arrival rate of messages into that stage. In one embodiment, any stage whose latency midpoint (e.g., corresponding to peak 1102 in FIG. 11) is greater than the maximum of the inter-arrival rate plus a prior stage's upper bound may be highlighted (e.g., the portion of stage 3 in FIG. 6 above 87 microseconds could be highlighted) to indicate that this particular stage is incurring a queue, as inputs are arriving at a rate faster than they can be processed, and therefore is a bottleneck. A developer analyzing the performance of the application depicted in Multi-Stage View 600 can determine that messages must wait before entering stage 3, and therefore should spend resources, e.g., time and/or computer resources, to improve the performance of stage 3 of the application. The developer could also easily determine that for the state illustrated in FIG. 6, spending time/computing resources to minimize stage 1 would have minimal, if not zero, impact on the overall application response time.

The software developer can interact with the displayed Multi-Stage View via user input device 216, e.g., a mouse, to generate different application states. In particular, the developer can visually interact with the parameters presented in the Multi-Stage View to predict the impact of changes to a single stage's service time on overall system response time. Interactions may include, for example, clicking and dragging elements of the Multi-Stage View with a mouse, or pinching and/or zooming using fingers on a touch interface, etc. As the developer modifies the inter-arrival rate line, the locations of one or more boxes, and/or the latency distributions (e.g., the heights) of the boxes, the simulated application state is input into a latency prediction system, such as latency prediction system 508. The resulting application latency/application response time 614, based on information provided by the latency prediction system 508 to the state generation system 506, may be updated based on the simulated application state. In one embodiment, the simulated state may highlight stages/areas of the application that should be prioritized for performance improvement.

The developer can simulate different application states to determine what effect, if any, will be had on an application's response time by improving the performance of individual states. The developer can simulate different state positions in several ways. The user or developer can simulate different inter-arrival rate of messages by dragging, via a user interface such as a mouse or via a touchscreen display, the inter-arrival rate line up or down. The inter-arrival rate of messages is typically out of the control of the exchange computing system. In a high-speed, dynamic environment such as an exchange computing system, the rate of messages arriving into the system largely depends on the actions of traders/trading firms that wish to execute instructions/process orders by submitting electronic data transaction request messages. A user of the Multi-Stage View can easily simulate the effects of different inter-arrival rates on application performance by moving the inter-arrival rate line to different positions within the Multi-Stage View.

The Multi-Stage View also enables the user to move the positions and latency distributions (i.e., heights) associated with the boxes. For example, the developer can move a box down to model that the associated stage's latency has been reduced/improved. The developer can also drag the upper or lower ends of the box up or down to simulate a different latency distribution (i.e., increased or reduced latency variance) for that stage.

Figure 7:
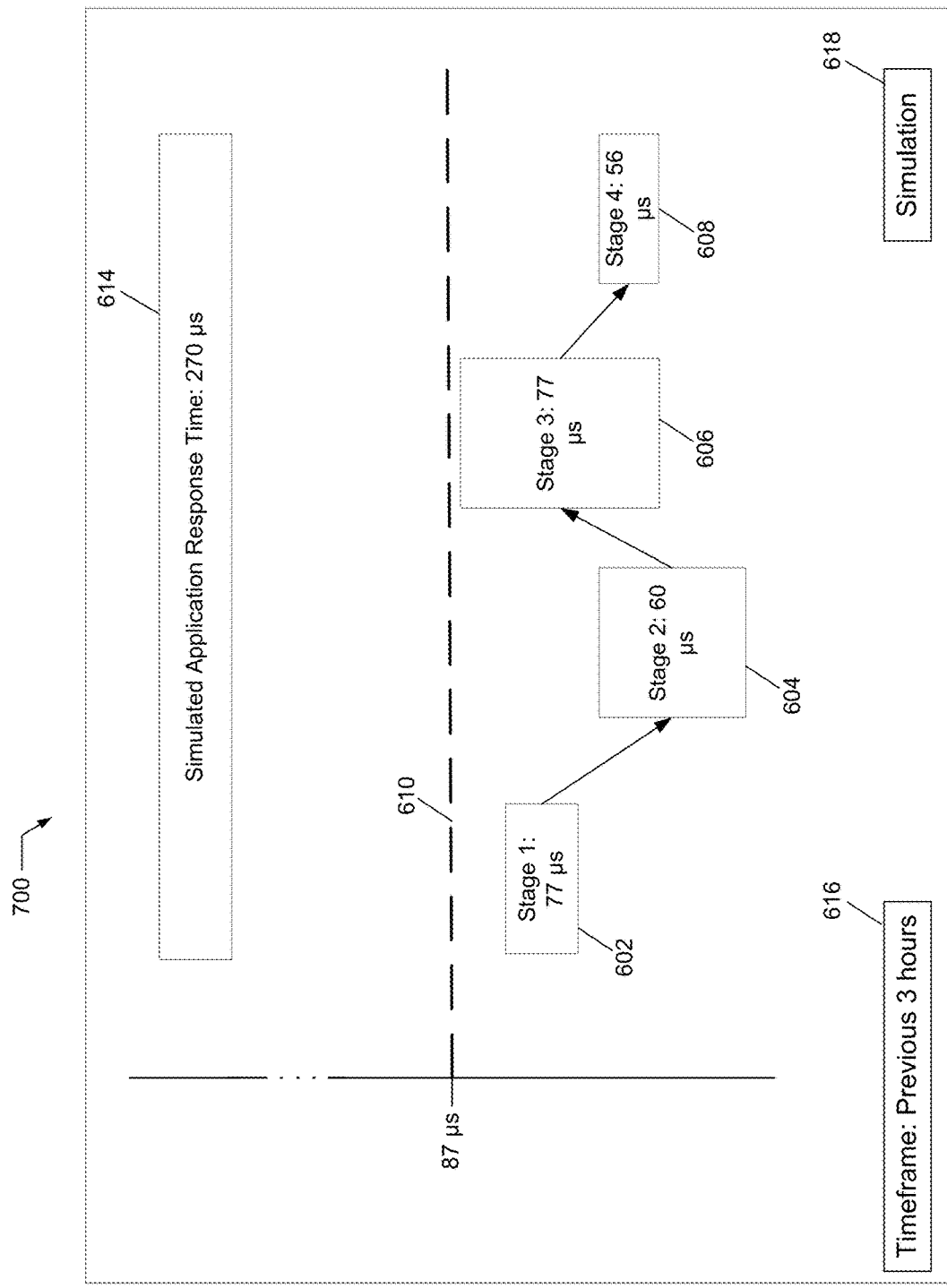
FIG. 7 illustrates another Multi-Stage View generated by a state generation system, according to some embodiments.

FIG. 7 illustrates an example Multi-Stage View 700 that depicts a simulated application state and response. In Multi-Stage View 700, the developer has modified state 600 of FIG. 6 by repositioning stage 3 to simulate a lower latency for stage 3, namely, by reducing the latency of stage 3 from 92 microseconds to 77 microseconds, an improvement of 15 microseconds. As shown in FIG. 7, the application response time 614 in simulated view 700 improves by more than 15 microseconds, from 290 microseconds to 270 microseconds, because moving stage 3 down eliminates the queue time before stage 3.

The state generation system may be configured so that upon detecting a movement of a box in the Multi-Stage View, the state generation system 506 communicates the change in the state of the box to the latency prediction system 508.

The latency prediction system 508 uses the new/simulated system state to estimate an application response time for the simulated state and provides the simulated response time to the state generation system 506 for display via the Multi-Stage View. The latency prediction system 508 may use historical data, e.g., from the performance measurement system 504, to estimate an overall application response time. For example, in Multi-Stage View 700, the latency prediction system 508 receives as inputs:

Inter-arrival message rate into the application (e.g., the inter-arrival message rate line to the left of stage 1): 87 microseconds;
Stage 1: 77 microseconds;
Stage 2: 60 microseconds;
Stage 3: 77 microseconds;
Stage 4: 56 microseconds;

and searches for historical information similar to some or all of the input characteristics. For example, the latency prediction system calculates that none of the stages will incur a queue, and that the application response time will be the sum of the stage response times, i.e., 270 microseconds. The latency prediction system 508 accordingly provides 270 microseconds to state generation system 506, which displays 270 microseconds via element 614 in Multi-Stage View 700. Again, the latency prediction system 508 may be the latency prediction system described in the '614 application or may be another latency prediction system that accepts the output (e.g., the application state) of the state generation system 506 as an input and simulates/outputs an application response time for that input application state.

When the user manipulates the elements of the Multi-Stage View 700 to generate a simulated application state, the Multi-Stage View 700 displays Simulation Mode indicator 618, which prominently indicates to the developer that the displayed information is based on a simulated/modification of the state, and not based on information actually collected by the performance measurement system. Box 614 may also include the word "Simulated" when the position of box 614 is based on a simulated application state.

In one embodiment, instead of illustrating the application response time as a box, the Multi-Stage View may present the application response time as a time series that displays an expected latency over a number of messages. The simulated application latency may vary as the number of simulated messages increases, because as more messages are processed, the likelihood that queues build up increases. If the latency prediction system only simulates one message going through/being processed by all of the stages, the latency prediction system will not predict the buildup of a queue. But, if the latency prediction system simulates 100 messages going through the application, some of the later messages may need to wait in a queue, which would result in a longer application response time. The simulated application response time may accordingly be illustrated as a box that is centered around an average latency and associated with a latency distribution, or alternatively may be illustrated as a time series of simulated messages processed by the stages in sequence.

Figure 8:
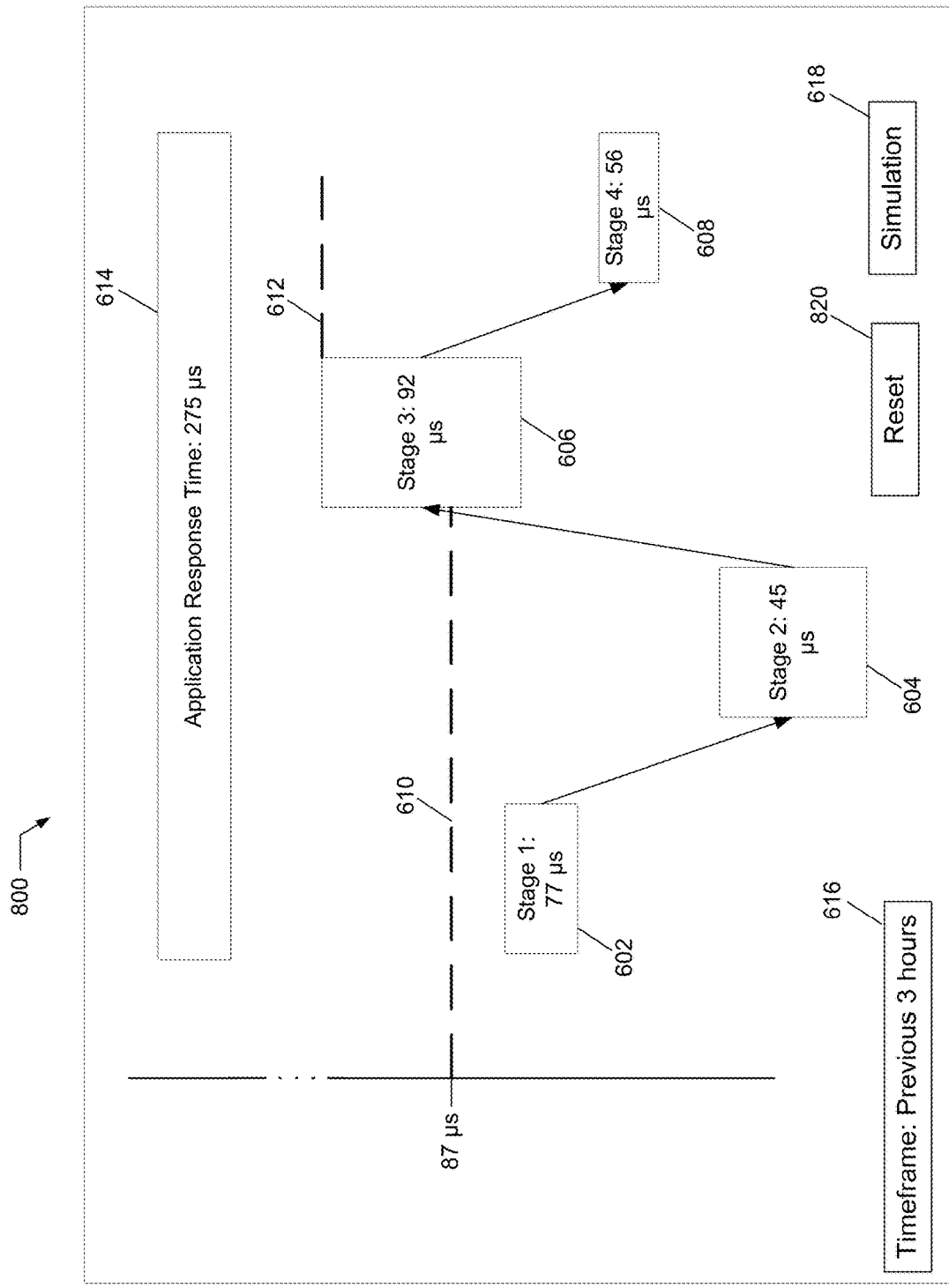
FIG. 8 illustrates yet another Multi-Stage View generated by a state generation system, according to some embodiments.

FIG. 8 illustrates an example Multi-Stage View 800 that depicts a simulated application state and response where the developer has modified state 600 of FIG. 6 by repositioning stage 2 to simulate a lower latency for stage 2, namely, by reducing the latency of stage 2 from 60 microseconds to 45 microseconds, an improvement of 15 microseconds. As shown in FIG. 8, the application response time 614 in simulated view 800 improves by exactly 15 microseconds, from 290 microseconds to 275 microseconds.

Thus, the developer can easily ascertain that according to the latency prediction system, investing code optimization time and/or computing resources to cause a 15 microsecond improvement in the performance of stage 3 will result in better overall application performance than investing code optimization time and/or computing resources to cause the same amount of time improvement, i.e., 15 microsecond improvement, in the performance of stage 2.

In one embodiment, the simulated Multi-Stage Views 700 and 800 may be simultaneously displayed on the same display device, for ease of comparison.

As shown in FIG. 8, a simulated Multi-Stage View may also provide a Reset button 820. Reset button 820 may be used to reset/reposition all of the stages in the Multi-Stage View based on performance data actually collected, like the Multi-Stage View 600 in FIG. 6.

Figure 9:
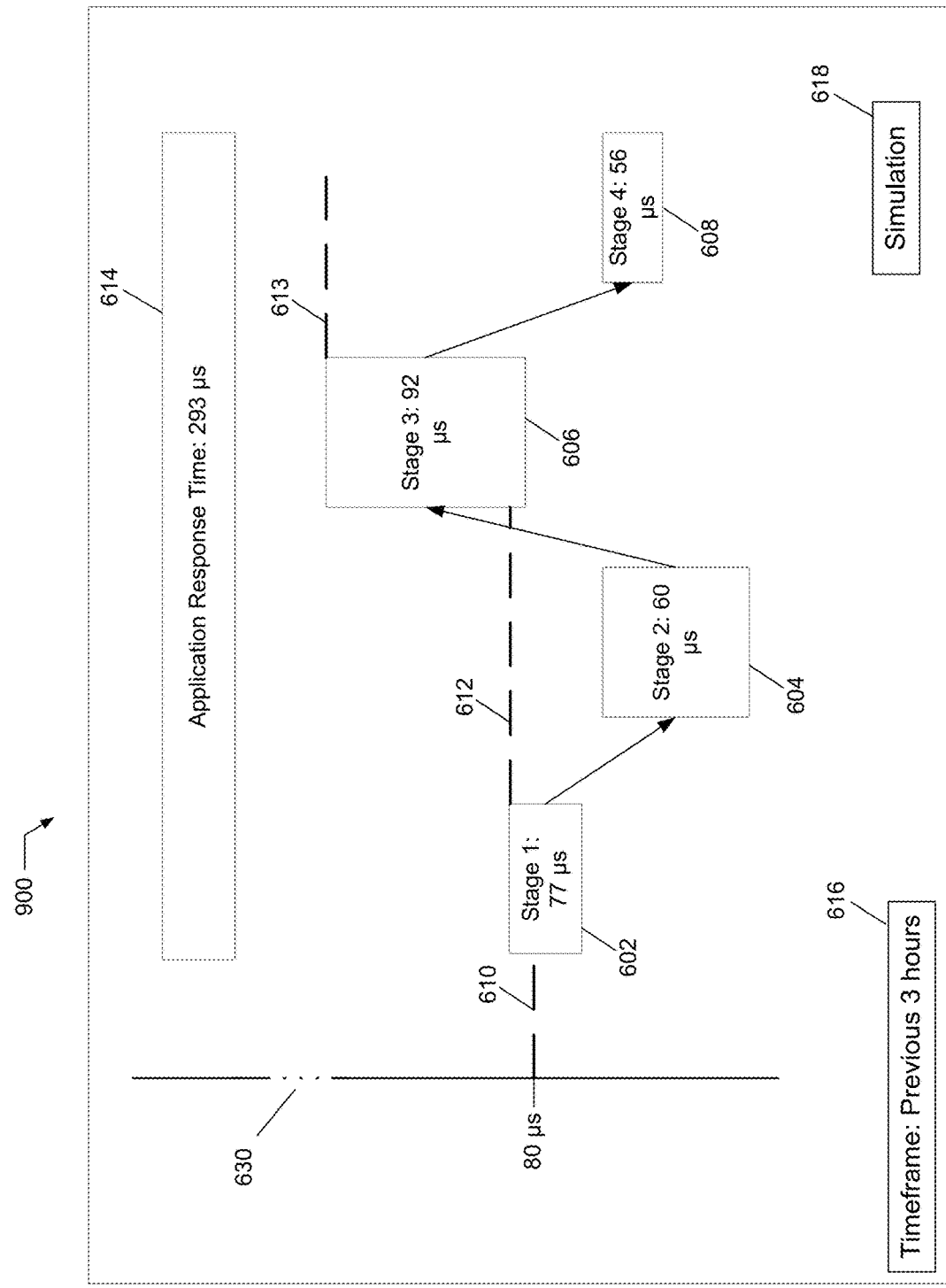
FIG. 9 illustrates still another Multi-Stage View generated by a state generation system, according to some embodiments.

FIG. 9 illustrates an example Multi-Stage View 900 that depicts a simulated application state and response where the developer has modified state 600 of FIG. 6 by lowering inter-arrival rate line by 7 microseconds. For example, the developer may wish to test the latency of the system if the number of messages received by the exchange computing system were to suddenly increase, e.g., to simulate a sudden change in the electronic trading markets. As shown in FIG. 8, the application response time 614 in simulated view 900 increases to 293 microseconds, because now stage 1 is also incurring a bottleneck. The user may then use the state generation system/Multi-Stage View to determine how much time/resources should be allocated/re-allocated to stages 1 and 3 to optimize the improvement in overall application performance.

The simulated states and application response times in FIGS. 7 through 9 are examples but highlight the non-linear/unpredictable nature of the effects of state changes. The latency prediction system is a complex system that accounts for hundreds or thousands of different combinations of varying stage latencies, stage distributions and inter-arrival rates into the application.

Figure 10:
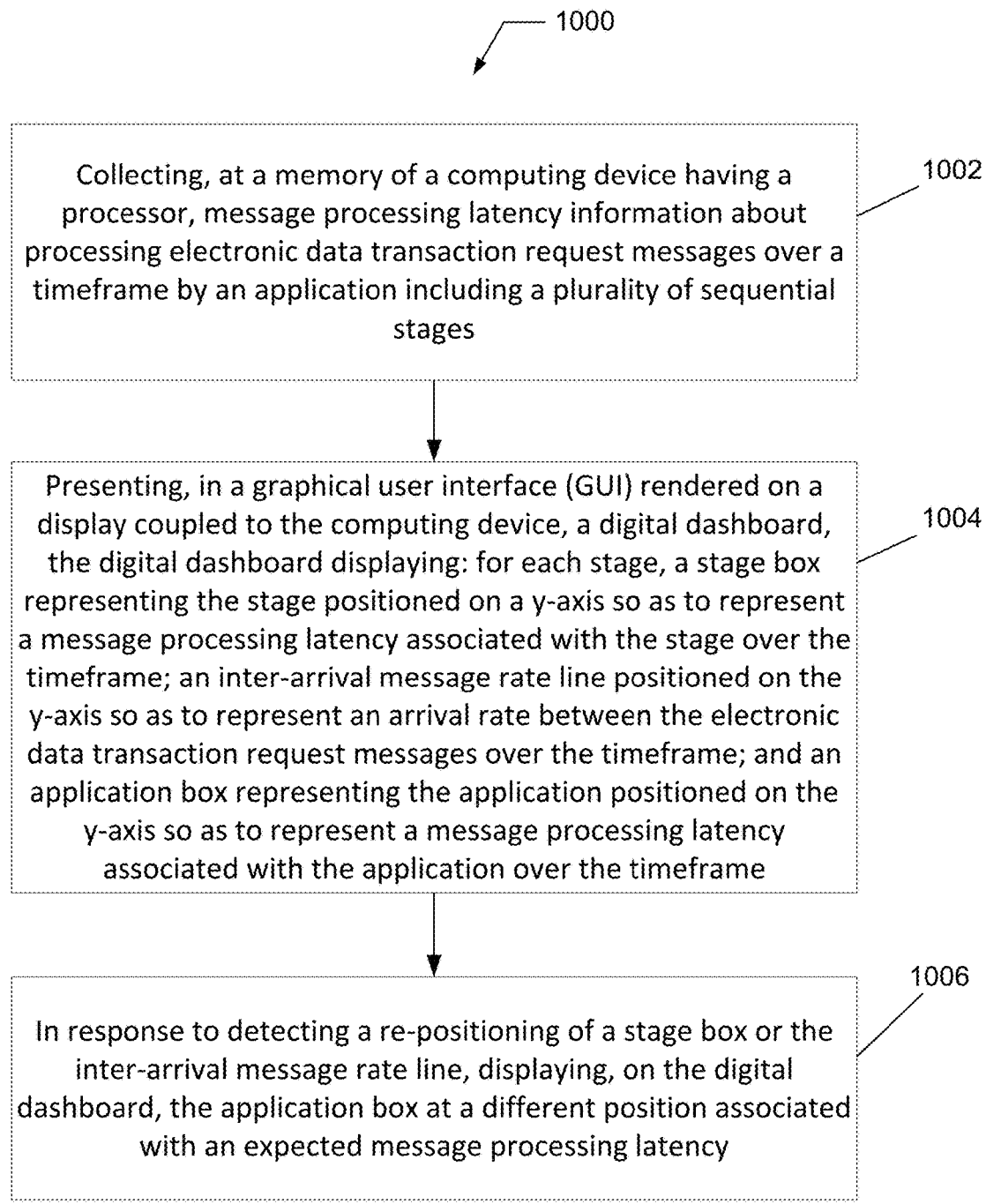
FIG. 10 depicts a high-level flowchart illustrating a method for presenting message processing latency information for an application including multiple sequential stages, according to some embodiments.

FIG. 10 illustrates an example flowchart of an example computer implemented method 1000. Embodiments may involve all, more or fewer actions than the illustrated actions. The actions may be performed in the order or sequence shown, or in a different sequence. The actions may be performed simultaneously, or in a parallel or overlapping fashion. The method may be performed by processing logic that may comprise hardware (circuitry, dedicated logic, etc.), software, or a combination of both. In one example, the method is performed by the computer system 100 of FIG. 1, while in some other examples, some or all of the method may be performed by another machine.

At step 1002, method 1000 includes collecting, at a memory of a computing device having a processor, message processing latency information about processing electronic data transaction request messages over a timeframe by an application including a plurality of sequential stages. For example, a performance measurement system may collect message processing latency information about processing electronic data transaction request messages. The application may include multiple stages defined by checkpoints.

At step 1004, method 1000 includes presenting, in a graphical user interface (GUI) rendered on a display coupled to the computing device, a digital dashboard, the digital dashboard displaying: for each stage, a stage box representing the stage positioned on a y-axis so as to represent a message processing latency associated with the stage over the timeframe; an inter-arrival message rate line positioned on the y-axis so as to represent an arrival rate between the electronic data transaction request messages over the timeframe; and an application box representing the application positioned on the y-axis so as to represent a message processing latency associated with the application over the timeframe. For example, the state generation system may present information collected by the performance measurement system on the digital dashboard.

At step 1006, method 1000 includes, in response to detecting a re-positioning of a stage box or the inter-arrival message rate line, displaying, on the digital dashboard, the application box at a different position associated with an expected message processing latency. For example, a user may modify one or more of the stages boxes and/or inter-arrival message rate line, which defines a new system state. The simulated system state is input to a latency prediction system, which estimates a new/simulated application response time. The state generation system then presents the simulated application response time via the dashboard.

The Multi-Stage View may enable the developer to simulate a large combination of different simulated states, in varying degrees of improvements. The Multi-Stage View enables the user to interface with a complex data-driven latency prediction system. Text inputs into and outputs out of a latency prediction system would not convey the relationships between the different stages and would be cumbersome to use. Moreover, a text-based interface (without the visual presentation of the Multi-Stage View) would be complicated, and prone to user error due to increased data entry via a keyboard.

The Multi-Stage View may enable otherwise unpredictable optimization suggestions, such as reducing stage 1 by 15 microseconds and stage 3 by 5 microseconds, instead of just reducing stage 1 by 15 microseconds, for example. The latency prediction system, because it is based on estimates based on previously processed messages, can account for the sequence of stages, where earlier stages may have a disproportional impact on the overall latency. For example, if stage 1 is above the inter-arrival rate line, that generates a bottleneck at the beginning of the application. Even if all of the other stages are optimized, in some applications, a stage 1 bottleneck may cause a large delay that can only be fixed by addressing the message processing latency of stage 1. But if two stages in the middle of the application, e.g., stages 2 and 3, are both bottlenecks, more than one approach may be useful in improving overall latency. For example, the Multi-Stage View may help determine if message processing improvement efforts (via time and resources) should be targeted towards stage 2, stage 3, or in some combination towards both stages 2 and 3. Thus, the state generation system for visualizing and interacting with a latency prediction system allows for more intelligent and thoughtful means for optimizing the performance of a software application.

In one embodiment, the state generation system may depict, via Multi-Stage View, multiple inter-arrival rate lines, one for each message type. A latency prediction system, such as the latency prediction system described in the '614 application, may generate latency estimations based on electronic data transaction request message characteristics, or types, e.g., a new order, a modify order, or a cancel order. The Multi-Stage View may display inter-arrival rate lines for messages of each of these message types, and also allow the developer to simulate changes to the inter-arrival rate lines for one or more of these message types.

Resource Allocation

Figure 12:
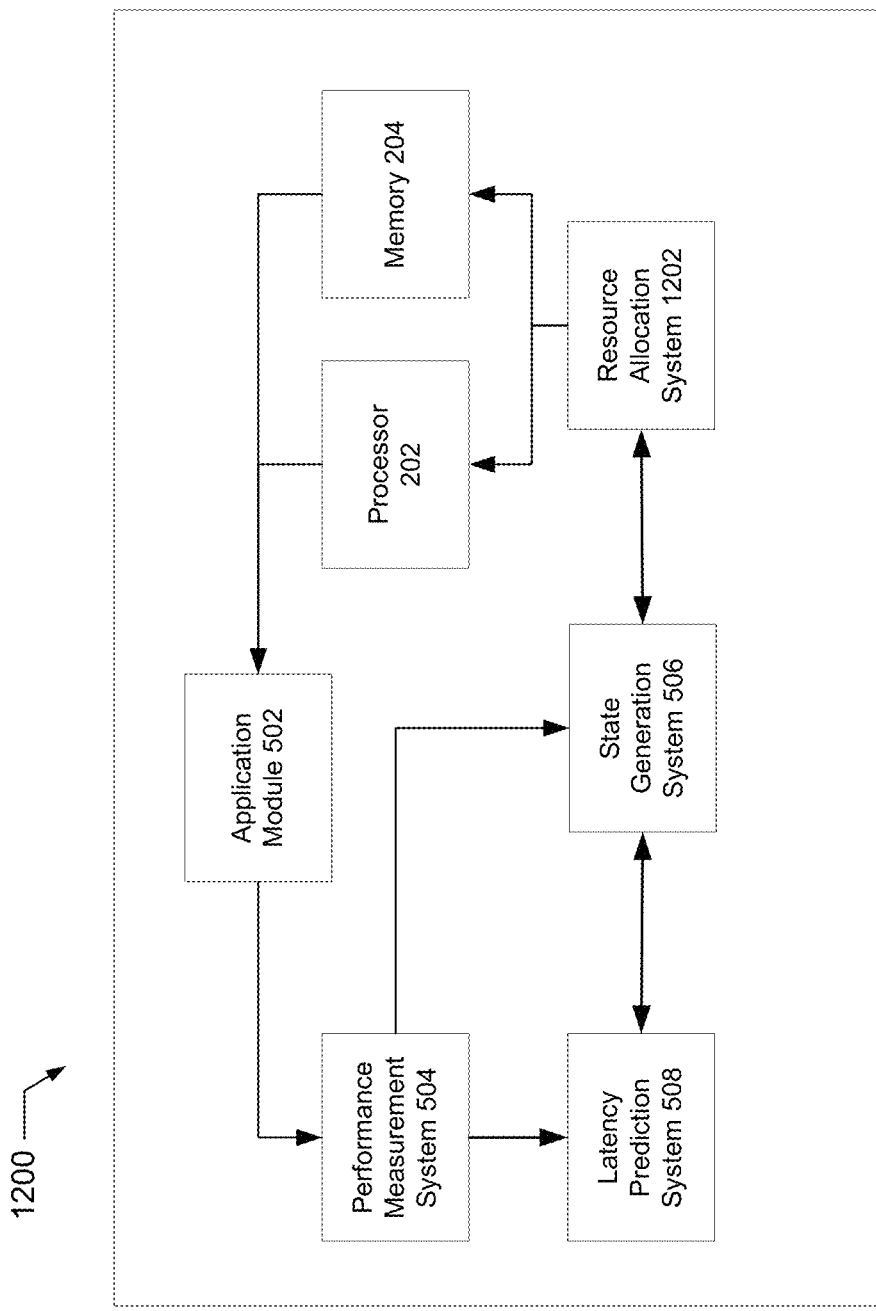
FIG. 12 depicts a block diagram of a computer system including a state generation system coupled to a resource allocation system, according to some embodiments.

In one embodiment, the state generation system may be implemented to control/re-allocate the amount of resources allocated for a stage within an application. FIG. 12 illustrates an example block diagram of a system 1200 including state generation system 506 that is coupled to, or provides an interface, e.g., the Multi-Stage View, to, a resource allocation system 1202 that automatically reallocates or distributes computing resources, such as memory 204, CPU processing cycles 202, cores and/or threads, among the various stages of an application module 502.

In response to a user repositioning a box associated with a stage via the Multi-Stage View, the resource allocation system 1202 automatically reallocates available resources so that the stage can process messages at a message processing latency defined by the repositioned box. Upon receiving inputs (i.e., repositioned boxes) from the Multi-Stage View, the resource allocation system 1202 may reallocate CPU resources among the various stages so that the simulated message processing latencies defined by the Multi-Stage View can be achieved.

Typically, an application, e.g., match engine module 106, is implemented on one physical device, e.g., a CPU. Thus, the stages within the match engine module share a common set of CPU resources, such as the cores dedicated to a given task such as conversion, matching, or publishing. The cores or processing threads dedicated for a task controls the speed at which the task can be performed. A core is an independent processing unit (e.g., hardware) that reads and executes program instructions. A thread is a section of software code or program instructions being processed. A software application includes at least one processing thread. In a single-threaded program, the code is read in order, from beginning to end. A core typically handles one processing thread, although some cores handle multiple threads.

The amount of resources allocated to an application stage affects that stage's message processing latency. For example, referring to FIG. 4A, the amount of computing resources associated with the conversion component/stage 402 affects how quickly messages can be received by the match engine module, because messages need to be converted to a format that the match component can read. The matching component/stage 404 matches or attempts to match incoming messages. The publish component/stage 410 publishes output messages via market data feeds. The more computing resources available to a stage, the faster that stage can perform its task, and the lower the message processing latency associated with that stage.

When the Multi-Stage View is coupled to a resource allocation system 1202, the Multi-Stage View is a controller for the resource allocation system 1202 that can automatically and dynamically allocate/re-allocate computing resources amongst the different stages of an application.

By reallocating computing hardware and software resources, the disclosed embodiments allow a developer to not only determine which stages should be prioritized/optimized first, the disclosed embodiments actually optimize or tailor the use of available, finite resources for each stage.

For example, the conversion component 402 receives/converts messages so they can be processed by the match engine, the match component 406 matches or attempts to match the incoming messages, and the publish component 410 publishes outgoing messages back to customers, e.g., via a data feed. In one embodiment, the resource allocation system 1202 reallocates the amount of CPU resources, e.g., cores or processing threads, that are dedicated to the stages based upon the state defined by the Multi-Stage View.

Referring now to FIGS. 6 and 7, when the developer repositions box 606 associated with stage 3 so that the average latency (or latency midpoint) is 77 microseconds, the resource allocation system 1202 makes available computing resources to stage 3 so that stage 3's message processing latency is reduced to 77 microseconds. The Multi-Stage View accordingly is a controller for the resource allocation system 1202, where moving a box to a higher or lower latency position causes the resource allocation system 1202 to allocate the resources in such a manner that the actual message processing latency of the stage targets or tracks the message processing latency represented by its corresponding box.

In one embodiment, the resource allocation system 1202 allocates power resources to one computing stage over another computing stage, based upon re-positioning of the stage boxes in the Multi-Stage View. Or, the resource allocation system 1202 reallocates cooling capacity, e.g., fans, towards one computing stage over another computing stage, based upon re-positioning of the stage boxes in the Multi-Stage View.

Alternatively, or additionally, in one embodiment, the resource allocation system 1202 reallocates power resources from one stage to another stage, based upon re-positioning of the stage boxes in the Multi-Stage View. Or, the resource allocation system 1202 reallocates cooling capacity, e.g., fans, from one stage to another stage, based upon re-positioning of the stage boxes in the Multi-Stage View.

The resource allocation system 1202 may alternatively vary the amount of memory (e.g., random access memory) available to a stage, or the amount of cache storage available to a stage, based upon a state being simulated on the Multi-Stage View.

In one embodiment, the state generation system automatically determines an optimized system state and presents the optimized state via the Multi-Stage View, where each box is positioned to optimize available computing resources.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method comprising:
    collecting, at a memory of a computing device having a processor, by the processor, message processing latency information about processing electronic data transaction request messages over a timeframe by an application including a plurality of sequential stages;
    presenting, by the processor, in a graphical user interface (GUI) rendered on a display coupled to the computing device, a digital dashboard, the digital dashboard displaying:
        for each stage, a stage box representing the stage positioned on a y-axis so as to represent a message processing latency associated with the stage over the timeframe;
        an inter-arrival message rate line positioned on the y-axis so as to represent an arrival rate between the electronic data transaction request messages over the timeframe; and
        an application box representing the application positioned on the y-axis so as to represent a message processing latency associated with the application over the timeframe; and
    in response to detecting a re-positioning of a stage box or the inter-arrival message rate line, displaying, by the processor, on the digital dashboard, the application box at a different position associated with an expected message processing latency.

2. The computer implemented method of claim 1, wherein each stage is initially allocated an amount of computing resources, the method further comprising, in response to detecting a repositioning of a stage box, reallocating, by the processor, at least a portion of the computing resources amongst the stages based upon the movement.

3. The computer implemented method of claim 2, wherein computing resources comprise processing cycles, processing threads, cores, or memory.

4. The computer implemented method of claim 2, wherein if a stage box is re-positioned to be lower on the y-axis, the amount of computing resources allocated to the re-positioned stage box is increased.

5. The computer implemented method of claim 1, wherein a height of a stage box and application box represents a message processing latency distribution associated with the corresponding stage or application.

6. The computer implemented method of claim 1, wherein any portion of a stage box that is displayed above the inter-arrival message rate line preceding the stage box is highlighted to indicate a bottleneck.

7. The computer implemented method of claim 1, wherein the expected message processing latency is determined based on the movement of the stage box or the inter-arrival message rate line.

8. The computer implemented method of claim 1, wherein the positions of the stage boxes and the inter-arrival message rate line collectively define a state of the application, the method further comprising determining the expected message processing latency by providing a state of the application to a latency prediction system.

9. The computer implemented method of claim 8, further comprising receiving information about the different position for the application box from the latency prediction system.

10. The computer implemented method of claim 9, wherein the latency prediction system determines the expected message processing latency based on message processing latencies for previously processed electronic data transaction request messages.

11. A non-transitory computer-readable medium storing instructions that, when executed by a processor, cause the processor to:
    collect message processing latency information about processing electronic data transaction request messages over a timeframe by an application including a plurality of sequential stages;
    present, in a graphical user interface (GUI) rendered on a display coupled to the processor, a digital dashboard, the digital dashboard displaying:
        for each stage, a stage box representing the stage positioned on a y-axis so as to represent a message processing latency associated with the stage over the timeframe;
        an inter-arrival message rate line positioned on the y-axis so as to represent an arrival rate between the electronic data transaction request messages over the timeframe; and
        an application box representing the application positioned on the y-axis so as to represent a message processing latency associated with the application over the timeframe; and
    in response to detecting a re-positioning of a stage box or the inter-arrival message rate line, display, on the digital dashboard, the application box at a different position associated with an expected message processing latency.

12. The non-transitory computer-readable medium of claim 11, wherein each stage is initially allocated an amount of computing resources, and wherein the instructions are configured to cause the processor to, in response to detecting a repositioning of a stage box, reallocate at least a portion of the computing resources amongst the stages based upon the movement.

13. The non-transitory computer-readable medium of claim 12, wherein computing resources comprise processing cycles, processing threads, cores, or memory.

14. The non-transitory computer-readable medium of claim 12, wherein if a stage box is re-positioned to be lower on the y-axis, the amount of computing resources allocated to the re-positioned stage box is increased to achieve a latency associated with the re-positioned stage box.

15. The non-transitory computer-readable medium of claim 11, wherein a height of a stage box and application box represents a message processing latency distribution associated with the corresponding stage or application.

16. The non-transitory computer-readable medium of claim 11, wherein any portion of a stage box that is displayed above the inter-arrival message rate line preceding the stage box is highlighted to indicate a bottleneck.

17. The non-transitory computer-readable medium of claim 11, wherein the expected message processing latency is determined based on the movement of the stage box or the inter-arrival message rate line.

18. The non-transitory computer-readable medium of claim 11, wherein the positions of the stage boxes and the inter-arrival message rate line collectively define a state of the application, and wherein the instructions are configured to cause the processor to determine the expected message processing latency by providing a state of the application to a latency prediction system.

19. The non-transitory computer-readable medium of claim 18, wherein the instructions are configured to cause the processor to receive information about the different position for the application box from the latency prediction system.

20. The non-transitory computer-readable medium of claim 19, wherein the latency prediction system determines the expected message processing latency based on message processing latencies for previously processed electronic data transaction request messages.

21. A computer system comprising:
means for collecting message processing latency information about processing electronic data transaction request messages over a timeframe by an application including a plurality of sequential stages;
means for presenting a digital dashboard, the digital dashboard displaying:
for each stage, a stage box representing the stage positioned on a y-axis so as to represent a message processing latency associated with the stage over the timeframe;
an inter-arrival message rate line positioned on the y-axis so as to represent an arrival rate between the electronic data transaction request messages over the timeframe; and
an application box representing the application positioned on the y-axis so as to represent a message processing latency associated with the application over the timeframe; and
means for, in response to detecting a re-positioning of a stage box or the inter-arrival message rate line, displaying, on the digital dashboard, the application box at a different position associated with an expected message processing latency.

* * * * *